(12) United States Patent
Ludwig et al.

(10) Patent No.: US 7,222,107 B2
(45) Date of Patent: May 22, 2007

(54) METHOD FOR INTER-ENTERPRISE ROLE-BASED AUTHORIZATION

(75) Inventors: Heiko H. Ludwig, Zurich (CH); Luke J. O'Connor, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/755,520

(22) Filed: Jan. 5, 2001

(65) Prior Publication Data

US 2001/0021928 A1     Sep. 13, 2001

(30) Foreign Application Priority Data

Jan. 7, 2000   (EP)  .................................. 00810016

(51) Int. Cl.
*G06F 17/00*   (2006.01)
(52) U.S. Cl. ..................... 705/67; 705/50; 705/51; 705/69; 705/72
(58) Field of Classification Search .............. 705/76, 705/67, 50, 51, 69
See application file for complete search history.

(56) References Cited

U.S. PATENT DOCUMENTS

| 5,659,616 | A | * | 8/1997 | Sudia | ........................... 705/76 |
|---|---|---|---|---|---|
| 5,996,076 | A | * | 11/1999 | Rowney et al. | ............. 713/201 |
| 6,125,349 | A | * | 9/2000 | Maher | ........................... 705/1 |
| 6,205,436 | B1 | * | 3/2001 | Rosen | ......................... 705/65 |
| 6,253,322 | B1 | * | 6/2001 | Susaki et al. | ............... 713/170 |
| 6,571,334 | B1 | * | 5/2003 | Feldbau et al. | ............. 713/170 |
| 2002/0004900 | A1 | * | 1/2002 | Patel | ......................... 713/155 |
| 2002/0029337 | A1 | * | 3/2002 | Sudia et al. | ................ 713/176 |

\* cited by examiner

*Primary Examiner*—Firmin Backer
(74) *Attorney, Agent, or Firm*—Lisa M. Yamonaco; Anne Vachon Dougherty

(57) ABSTRACT

A Transaction Authorization Method operating over a computer network comprising a plurality of interconnected computers and a plurality of resources, each computer including a processor, memory and input/output devices, each resource operatively coupled to at least one of the computers and executing at least one of the activities in the process flow, the method characterized in that it assembles an electronic authorization of a transaction in a manner which is verifiable by extracting and verifying whether role certificates of at least one type, associated with the authorization, are themselves authentic. The method eliminates the need of having to authorize each and every signature on a transaction individually by providing an authorization structure based on roles, this structure being accessible on a public network for verification that the transaction is authorized.

30 Claims, 15 Drawing Sheets

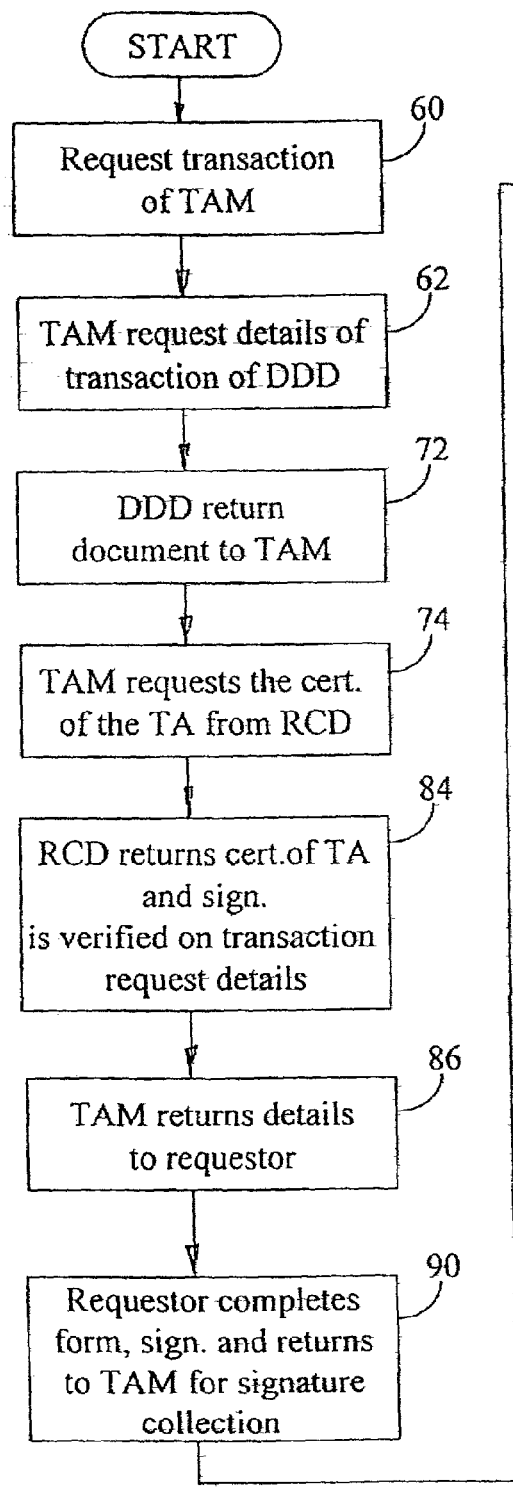
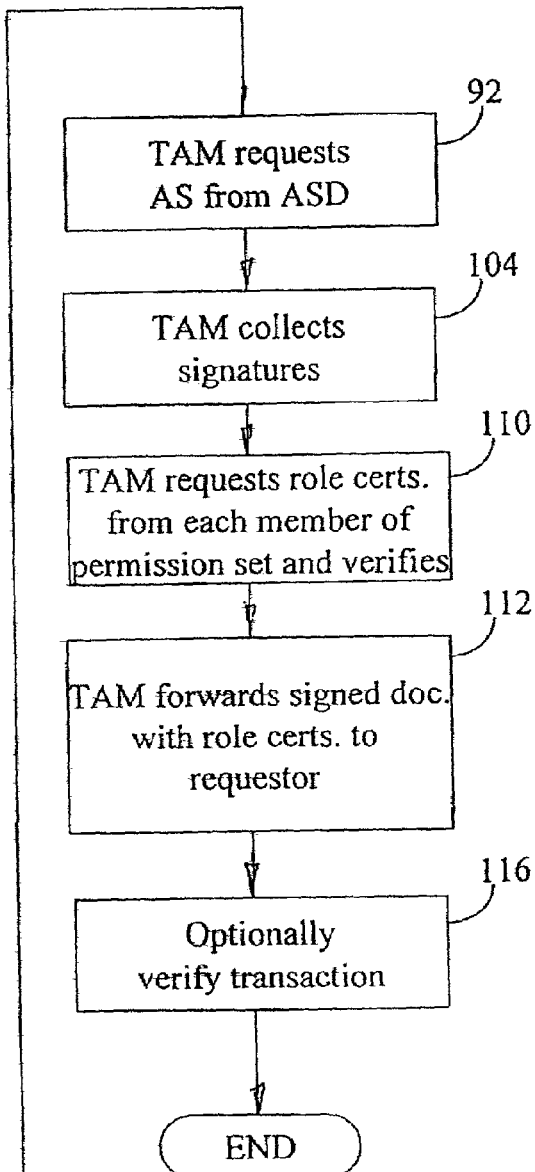
Fig.4

METHOD FOR INTER-ENTERPRISE ROLE-BASED AUTHORIZATION

FIELD OF THE INVENTION

This invention relates to e-commerce transactions, and, more particularly, to a method of both authorizing and verifying the authorization of transactions between enterprises over both public and private networks.

BACKGROUND OF THE INVENTION

Large-scale deployment of e-commerce solutions between various enterprises over public networks requires careful consideration of security issues. This is best explained through an example.

Two companies, company A and company B, have a formal agreement for making business transactions (i.e., any legally binding action between persons or organizations), such as an offer, an order or a cancellation. The possible set of transaction types between A and B may be denoted by $T(A,B)=\{T1, T2, \ldots, Tn\}$ where for example $T \in T(A,B)$ may denote T→"purchase X units of product Y at price P per unit".

The transaction types denoted by the set T(A, B) may be assumed to be general, and at the actual time when the particular transaction takes place, additional details beyond those given in the transaction descriptions of T(A,B) must be provided. For example, for transaction T, the requester will supply values for X, Y, and P, which are expected to vary over time.

The problem of specifying the set of transactions T(A, B), how they will be performed, the data exchanged and so on, could be solved using Electronic Data Interchange (<<EDI>>) syntax, such as in ISO 9735, available at http://www.r3.ch/standards/edifact/index.html. Further, these companies must coordinate over the Internet to fulfill their general transactions as specified in the set T(A,B).

A typical situation would be for a user UA of company A to receive a transaction of type $T \in T(A,B)$ from a user UB, that purports to be under the control of company B. Let us assume that UA is presented with a request from company B for company A to make X=1000 units of product Y at price P=$1 per unit and further that the user operates through software operating through a public network. Since the request originates from a public network, there are at least three security issues that UA may consider: (1) should the details (X, Y, P, UA, UB) of the transactions be confidential and encoded for integrity? (2) how does one verify that the user UB requesting the transaction is in fact controlled by company B? and (3) even if it is known that the user UB requesting the transaction is employed by company B, it is not clear how one verifies that UB is in fact authorized to request such a transaction for the given values of X, Y and P.

The first two points can be addressed using standard security protocols and cryptographic algorithms, as described in A. Menezes, P. van Oorschot, and S. Vanstone; *Handbook of Applied Cryptography*, CRC press, 1996. In particular, with public key cryptography each user Ux can be issued with one or several certificates (such as those described in ISO/IEC 9594, Information Technology—Open Systems Interconnection—The Directory: Authentication Framework, 1993) that can be used to demonstrate their identity through the use of digital signatures.

If UA and UB are acquainted personally then that existing trust relationship may be sufficient for UA to accept the request from UB as authorized, and this is how many inter-enterprise transactions are currently conducted. In this case, UA and UB have established some trust relationship, either specifically for the purpose of conducting future transactions, or perhaps the trust has been gained by successful previous transactions. However, general e-commerce will bring together people and companies who will have no prior business or trust relationships, and the transaction then must somehow be 'self-authorizing'. Traditionally authorization to data, applications, resources, or more generally simply objects, is administered using some form of access control. See D. E. Denning; *Cryptography and Data Security*. Addison—Wesley Publishing Company, 1982. In its most general form, there exists an access control matrix M that explicitly lists the access rights each user has with respect to each object O. As there may be many users Ui and objects Oj, the access control matrix M can be difficult to manage.

Perhaps the most common type of authorization is for there to be a general written document/form describing a transaction T, where certain details are provided by the requester at the time of the request, and the requester is then required to collect a set of handwritten signatures on the paper form, from one or several people who are able to approve transactions or requests of type T. For example, T may be a travel request form, which requires that the destination, duration of stay, expected costs and methods of transport be provided. The requester fills in these details, signs the request, and then takes the form to various superiors for their signatures in the appropriate places provided on the form. Typically the places in the form where a signature is required are labeled by the role of the people whose signatures are required, such as manager, department head or CEO.

This form of authorization is called the form-signature model, or authorization by co-signatures, or co-signing data. For example, the travel request transaction (T='travel request') may require the signature of the requester, the requester's manager and then the department head of the requester. Once the required signatures have been collected, the requester uses the signed document to authorize the transaction, say to have a travel agent book flights or hotels. Usually the travel agent is not concerned with verifying the details of the travel request, other than general checks such as the return date is after the departure date, or that some threshold of expense is not exceeded. What is of importance to the travel agent is the set of signatures accompanying the request, and the roles represented by these signatures. For many office tasks that do not involve significant amounts of funds, the form-signature model is adequate for granting task authorization. However, where more significant amounts of funds or resources are committed by the transaction, it becomes important to be certain that each signature is both authentic, and that the collection of signatures does, in fact, bind the company. In these cases, it becomes necessary to obtain direct approval of every transaction from an enterprise authority (i.e., Transaction Administrator such as the President, comptroller, or other officer) for confirmation that the lower level employees had authority to authorize the transaction.

A form-signature model for e-commerce includes: (1) an electronic representation of the task and the information required to perform the task (such as dates, costs, names), (2) a signature mechanism, and (3) a mechanism to relate the signatures accompanying the electronic task data to privilege for granting authorization for the task. Generally speaking, (1) and (2) can be solved directly using current methods and technology, while (3) has not yet be adequately addressed. With respect to (1) and (2), paper-based forms can be represented electronically as HTML or word-processor documents, and for a task T, let D(T) denote the electronic form/template of task T. If T is a 'travel request' then for example D(T) may be a HTML document requesting details of the trip to be taken, and there will also be a list of roles where users acting in these roles must sign the travel request details. Also there are several schemes for providing digital signatures, such as RSA or DSS, so the basic tools to implement the form-signature model in e-commerce are available. The more difficult part in the e-commerce form-signature model is to determine or verify that the set of collected signatures implies authorization for the task.

If a user U digitally signs data, it is implied that U has a public key Pub(U) and a private key Pri(U) such that Pub(U) is stored in a certificate, which we will denote as Cert(U). The certificate Cert(U) is stored in a public database or directory, so anyone may retrieve it and verify a signature purportedly produced by U with Pri(U). The certificate Cert(U) contains one or several names/identifiers for U, so U can be uniquely identified as the user who produced the signature. However in considering if another user is verified to request transaction T by examining a set of signatures on D(T), the important aspect is not so much who produced each signature but whether they have the authority to authorize T.

Therefore, what is needed is a method that frees the enterprise authority from having to verify every transaction and which enables efficient authorization and verification of authorization of e-commerce contracts, using standard security or cryptographic protocols, over an insecure public network. Still further, what is needed is a method for performing inter-enterprise authorization that reveals minimal information about the decision structures of the respective companies.

SUMMARY OF THE INVENTION

A transaction authorization method is provided which operates over a computer network comprising a plurality of interconnected computers and a plurality of resources, each computer including a processor, memory and input/output devices, each resource operatively coupled to at least one of the computers and executing at least one of the activities in the process flow. The method assembles an electronic authorization of a transaction in a manner that is verifiable by extracting and verifying whether role certificates of at least one type, associated with the authorization, are themselves authentic. The method eliminates the need of having to authorize each and every signature on a transaction individually by providing an authorization structure based on roles, this structure being accessible on a public network for verification that the transaction is authorized.

The method is applicable in both an intra-enterprise and an inter-enterprise context, because it makes anonymous authorization decisions based on roles, represented by anonymous role certificates. In this manner, the identities of the employees need not be divulged when verifying the authenticity of the transaction.

Further, the method uses an authorization tree for a particular transaction that determines what combination of roles can authorize transactions of that type.

In another feature involving inter-enterprise authorization, a hashed version of the authorization tree is used, thus providing proof that a given user is authorized to perform a transaction while revealing minimal information about the approval structures of the company. In this manner, the method allows verification of a company's decision structures in such a manner as to obscure the details of this structure.

An object of the invention is to promote e-commerce by providing a convenient and computerized means of ensuring that transactions are properly authorized and therefore enforceable.

Another object of the invention, where the hash table is used, is to reduce space requirements and to obscure the decision procedure information in the authorization tree while still permitting the transactions to be authorized, thus making the method particularly useful for intra-enterprise transactions.

BRIEF DESCRIPTION OF THE DRAWINGS

The invention will now be described in greater detail with specific reference to the appended drawings wherein:

FIG. 4 is a detailed flow diagram of the method of the invention;

DETAILED DESCRIPTION OF THE PREFERRED EMBODIMENT

Figure 1:
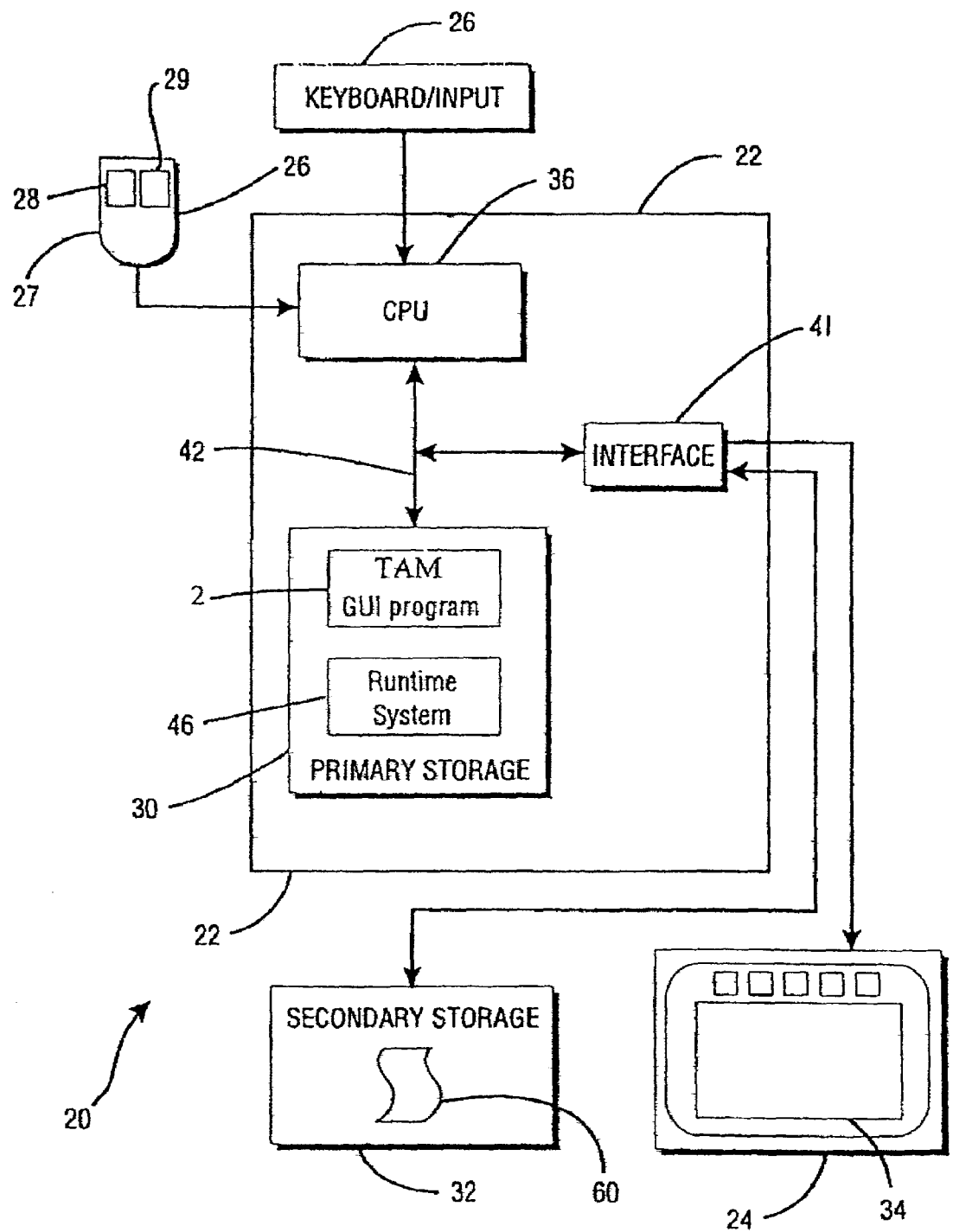
FIG. 1 is a block diagram of a computer system of the invention.

Referring now to FIG. 1, a Transaction Authorization Method ("TAM") 2 provides a means of ensuring the validity of contracts 4 in e-commerce by constructing such contracts in a manner such that their validity can be easily verified.

The TAM 2 has a message exchange mechanism that operates within the distributed workflow management system 6. The method 2 has the properties of (1) being accessible by users 8 to authorize requests 10; (2) having access to several databases 70, 82, 96 or 202 (shown in FIG. 11); and (3) contacting users to request signatures 18.

Figure 2:
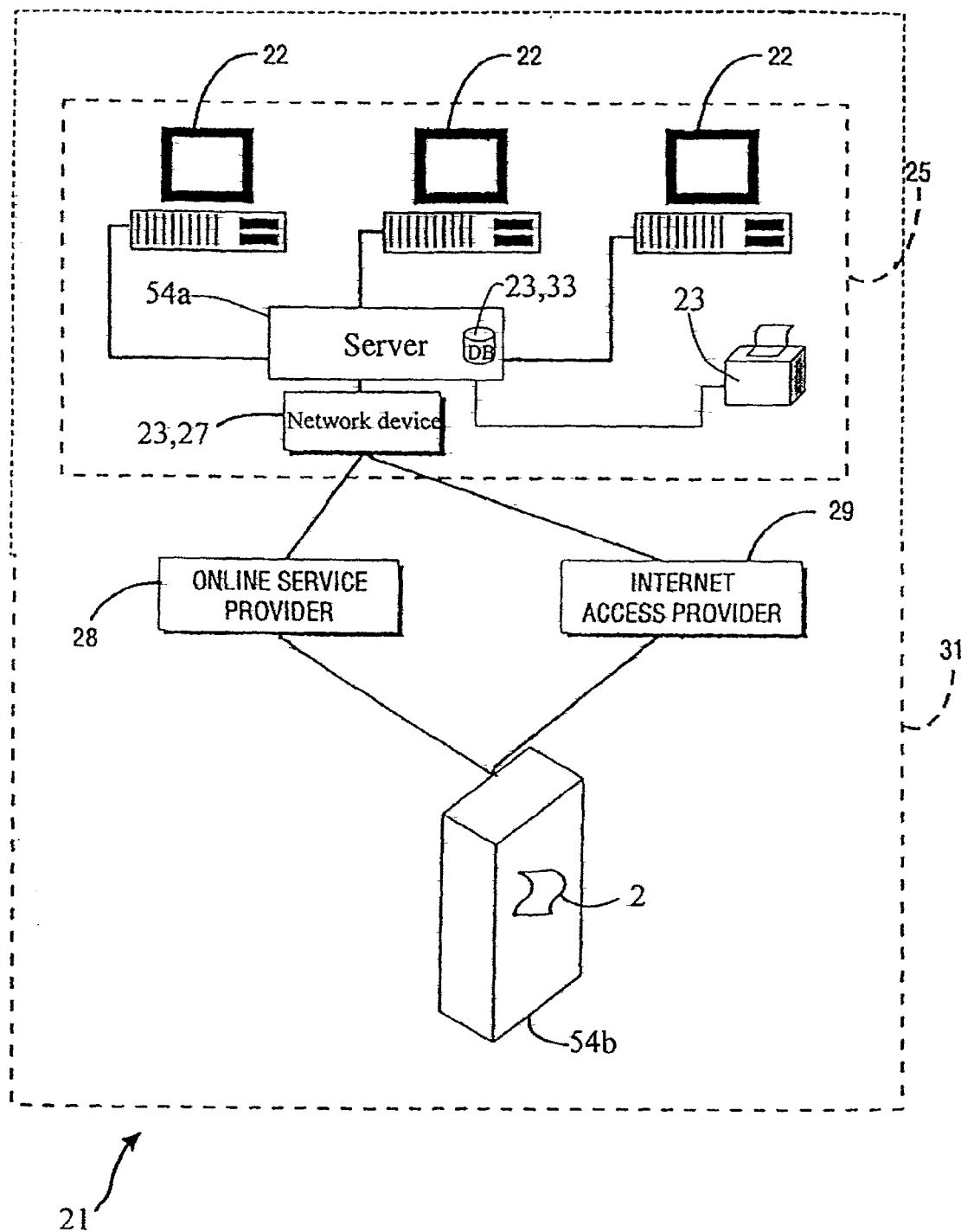
FIG. 2 is a schematic diagram of a network encoded with the method of the invention.

The TAM 2 operates on a computer system 20 in a distributed system 21 over a computer network 25 and/or 31 (shown in FIG. 3) comprising a plurality of interconnected computers 22 and a plurality of resources 23. The TAM 2 is encoded on computer-readable media and operates on the computer system 20 and/or between computer systems and one or more servers 54a or 54b (shown in FIG. 2) on an intranet 25 or the Internet 31.

The computer system 20 typically includes a computer 22, a display device 24, an input device 26 such as a keyboard, a primary storage device 30 and a secondary storage device 32. After loading of software encoded with the TAM 2 of the invention or after accessing the server 25 or 54 through a browser such as Internet Explore 5.0, as the case may be, the display device 24 displays a graphical user interface ("GUI") 34 for facilitating the display of text and graphics associated with the method to the user. Display devices 24 include printers and computer display screens such as a CRT, LED displays, LCDs, flat screens, screen phones, and projectors. Input devices 26 are numerous and include keyboards and pointing devices such as a mouse 27 having a left mouse button 28 and a right mouse button 29, a trackball, lightpens, thumbwheels, digitizing tablets, microphones using voice recognition software, and touch screens and pads.

Each resource 23 is operatively coupled to at least one of the computers 22 and executes at least one of the activities in the process flow of the method 2. Resources 23 include, but are not limited to, printers, databases, special-purpose servers, security devices, modems, etc.

The GUI 34 provides input fields for data input and control of the TAM 2, as well as an output window for displays of status and other information, which facilitates management and operation of the workflow system. The TAM 2 accesses a database 33 including information associated with transactions, discussed in detail below.

The computer 22 includes a CPU 36 as well as other components with which all who are skilled in the art are familiar. For a detailed discussion of these components and their interaction, see U.S. Pat. No. 5,787,254, the content of which is incorporated by reference. The secondary storage 32 supports the TAM 2, preferably HTTP-compliant, as well as a number of Internet access tools. The CPU 36 fetches computer instructions from primary storage 30 through an interface 41 such as an input/output subsystem connected to a bus 42. The computer 22 can be, but is not limited to, an "IBM APTIVA" computer, a product of International Business Machines Corporation of Armonk, N.Y., or any computer compatible with the IBM PC computer systems based on the X86 or Pentium(™) series processor of Intel Corporation or compatible processors, or any other suitable computer. The CPU 36 utilizes an operating system that, depending on the hardware used, may be DOS, "WINDOWS 3.X", "WINDOWS XXXX", "NT", "OS/X", "AIX", "LINUX", or any other suitable operating system. The CPU 36 executes these fetched computer instructions. Executing these instructions enables the CPU 36 to retrieve data or write data to the primary storage 30, display information, such as the statistical displays of the TAM 2, on one or more display devices 24, receive command signals from one or more input devices 26, or transfer data to secondary storage 32 or even other computer systems which collectively form a computer network 25 (shown in FIG. 2). Those skilled in the art understand that primary storage 30 and secondary storage 32 can include any type of computer storage including RAM, ROM, application specific integrated circuits ("ASIC") and storage devices that include magnetic and optical storage media such as a CD-ROM.

Figure 3:
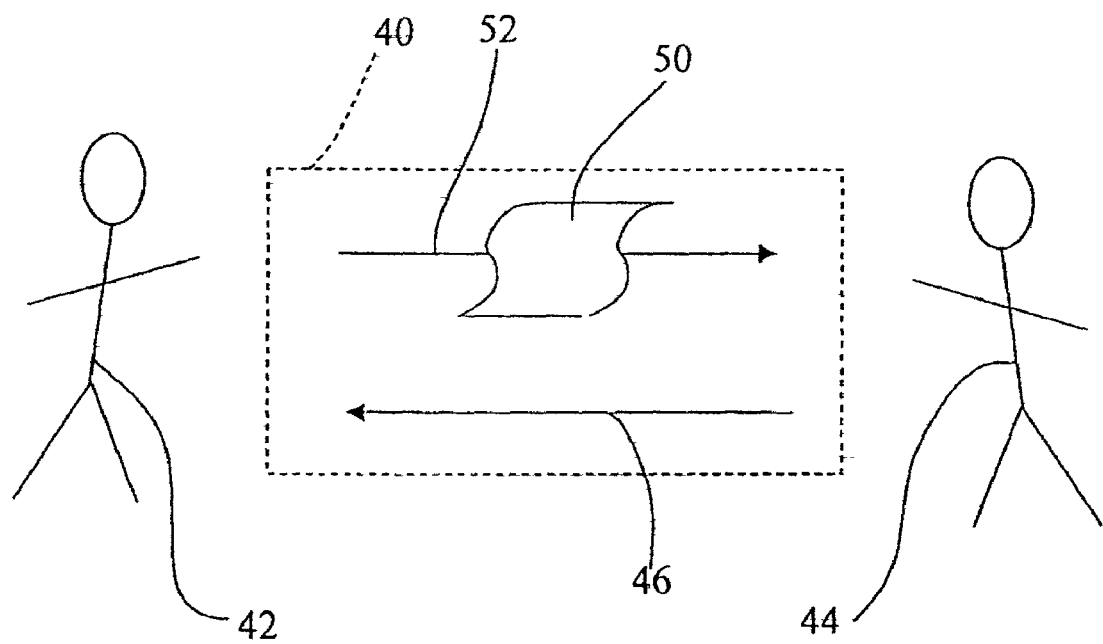
FIG. 3 is a schematic diagram of a transaction.

Referring now to FIG. 3 there are many classes of transactions 40 that are to be carried out online in the course of conducting e-commerce. In the context of this disclosure, each transaction 40 takes place between a requester 42 and a verifier/value provider 44 The requester 42 desires a product or service 46 and the value provider 44 wishes to be sure that the e-documentation 50, upon which the requester's request 52 is based, is properly authorized. Thus, the value provider 44 wishes to verify the authenticity of the document 50. In the most general context, the requester 42 and verifier 44 may or may not be employed by the same company.

For example, the document 50 associated with the request 52 may be a contract for products or services, such as a travel request document 54 (shown in FIG. 6) from an employee of the requesting company to the company's travel agent, or from the employee to the financial officer of the same company to determine if the required funds for the travel are available.

Now referring to FIG. 4, in which a more detailed flow diagram of the method is shown, the TAM 2 executes the following steps. In a first step 60, an employee 62 requests a transaction 40 from the TAM 2. In a second step 62, the TAM 2 requests the HTML representation 64 of details 66 of the transaction 40 from the Digital Document Database 70 (shown in FIG. 7). In a third step 72, the Digital Document Database 70 returns the HTML representation 64 of the transaction details 66 to the TAM 2. In a fourth step 74, the TAM 2 requests the role certificate 76 of the TA 80 from a Role Certificate Database 82 comprised of <<anonymous>> role certificates (the anonymity is implied since the user's name is not included in the certificate), including the role certificates of the TA 80 (this is discussed in more detail below). In a fifth step 84, the Role Certificate Database 82 returns the certificate 76 of the TA 80 and the TAM 2 verifies the signature 126 of the TA on the HTML representation 64 of the transaction request details 60 returned from the Digital Document Database 70. In step six 86, the TAM 2 returns the HTML transaction details 66 to the requester 42. In step seven 90, the requester 42 views the HTML representation 64, completes the details 66 specified (e.g., name, destination, costs, etc.), signs the completed HTML representation 64 and returns the signed HTML representation to the TAM 2 to collect any remaining signatures 106. In an eighth step 92, the TAM 2 requests the AS 94 for the transaction from the Authorization Structure Database 96. The returned AS 94 is pre-signed by the TA 80 and the signature is verified by the TAM 2. The TAM 2 chooses a permission set 100 of role names 102, and a collection of users to contact to sign in these role names. In step nine 104, the TAM 2 forwards details 66 of the transaction request 52 with the signature 106 of the regular-employee requester 42 to others having roles corresponding to the chosen permission set 100 and collect signatures of each role indicated in the permission set 100. For example the signature of a manager and a department manager is collected each signing the document 64 in his respective role. In step ten 110, the TAM 2 requests the role certificates 76 for each member of the permission set 100 and respective signature. In step eleven 112, the TAM 2 forwards the document 54 including the signatures 106 and role certificates 76 to the requester 42. Thus, a digital document 114 is created including all the authorization details 66 required in order to confirm the validity of the transaction 40. In step 116, optionally, the method 2 verifies the signed document 114.

Figure 9:
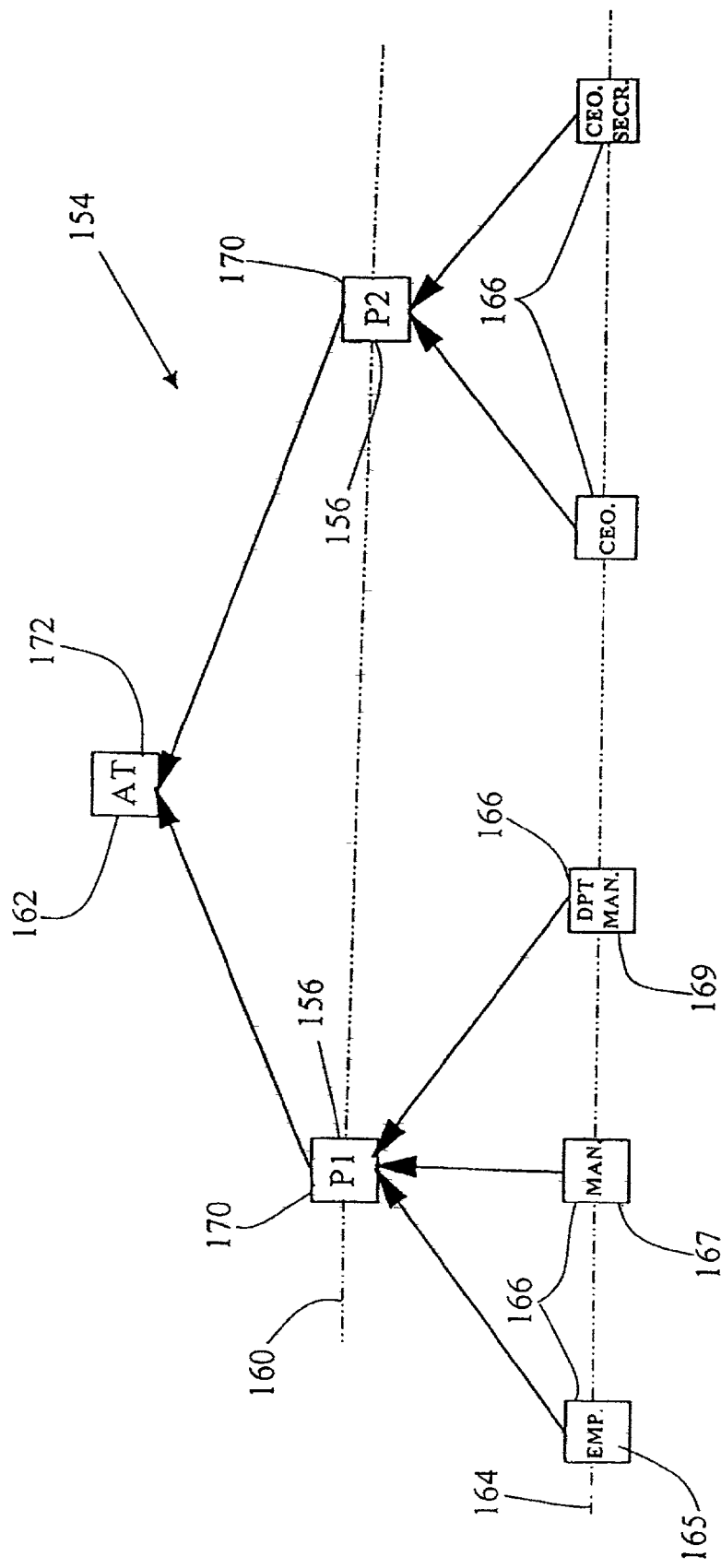
FIG. 9 is an authorization tree for a travel request.

Referring now to FIG. 9, in the method 2, the anonymous role certificate 76 is an association between a signature verification key 120 and a role 122. This differs from the standard certificate described in ITU-T X.509 (1997 E)(hereinafter <<X509>>), which is an association between a signature 106 verification key 120 and a name (not shown). More accurately stated, X509 is the association between a public key and a name, where the public key can be used for both encryption and signature verification. The method 2 of the invention, however, is not concerned with users performing encryption in the capacity of a role 122, but rather is concerned with users producing signatures 106 in the capacity of a role. The certificate 76 will be anonymous by not having any linking information to owner of the certificate. The 'owner' of a certificate Cert is implicitly defined as the user who has the private key that corresponds to the public key embodied in the certificate.

A role certificate 76 plays an important role in the method 2. It is assumed that within any company C there exists a set of well-defined roles RC={R1, R2, . . . , Rm}, and that each user U in the company C is assigned one or several roles UR ⊂RC. For the purposes of the method 2, it is assumed that each user has a X.509 public key certificate CertCA(U) that contains their name, public key and other fields, signed by some local certificate authority CA. As X.509 certificates contain extension fields for general information such as an e-mail address, alternative names, and policy information for example, it is possible that a designated role 122 could be included as an extension field. However the role 122 and owner of the certificate are linked explicitly since the certificate contains a name field. An IETF working group is also currently developing the concept of an attribute certificate (AC) (see S. Farrell; *An Internet Attribute Certificate Profile for Authorization*, Aug. 20, 1998) that binds attributes such as roles 122, group memberships and security clearance to a name. However, attribute certificates contain no public key, and that the name specified in the AC is meant to provide supplemental information related to an individual U named in an existing X.509 CertCA(U). Since the name of the certificate holder is included in the AC, then the name and role are linked directly. For the purposes of the method 2, both certificates 76 and ACs are acceptable because the method uses a certificate containing a role 122 to authorize an action, however, in the method, it is desirable that the role not be associated directly to the user it is assigned to.

Therefore, the method 2 uses an anonymous role certificate 76 (CertCA(U,R)) for user U, which is an X.509v3 certificate with the following changes: (1) the name field represents a fictitious user; (2) there is an extension field containing the role 122 for U ; (3) there is an extension field that contains a forward reference from Cert(U) to Cert(U, R).

The forward reference for example may take the form of E(C, U, passwd) that denotes the public key encryption of the concatenation of U and a password by the company C's public key or the local CA's public key. The forward reference is simply a mechanism for the company to be able to identify the owner of a role certificate, and it has no other importance to the method of the invention. If U has several roles 122 then there will be a role certificate 76 for each role. It is important to note that each role certificate has a public and corresponding private key so that users may produce signatures in their role capacities. Thus each user will have at least two certificates, a standard X.509v3 certificate CertCA(U) that binds their name to a public key, and then an anonymous role certificate 76 (CertCA(U,R)) that binds their role to a public key. CertCA(U) is linked to CertCA (U,R) by a forward reference, but given CertCA(U,R) there is no obvious way to determine CertCA(U) or the identity of U. For the purposes of the method 2, a signature 106 produced by a private key 124 associated with a role certificate 76 CertCA(U,R) is defined as a role signature 126.

Thus, if a user produced a signature 126 on a transaction 40, then a verifier 130 is interested in the role 122 that the user has in the company, such as whether user is a manager or department head, and how this role relates to the given task, if at all. The identity or name of user is in fact not important, as only the role 122 assumed by user is of concern in verifying if a task has been authorized.

Figure 5:
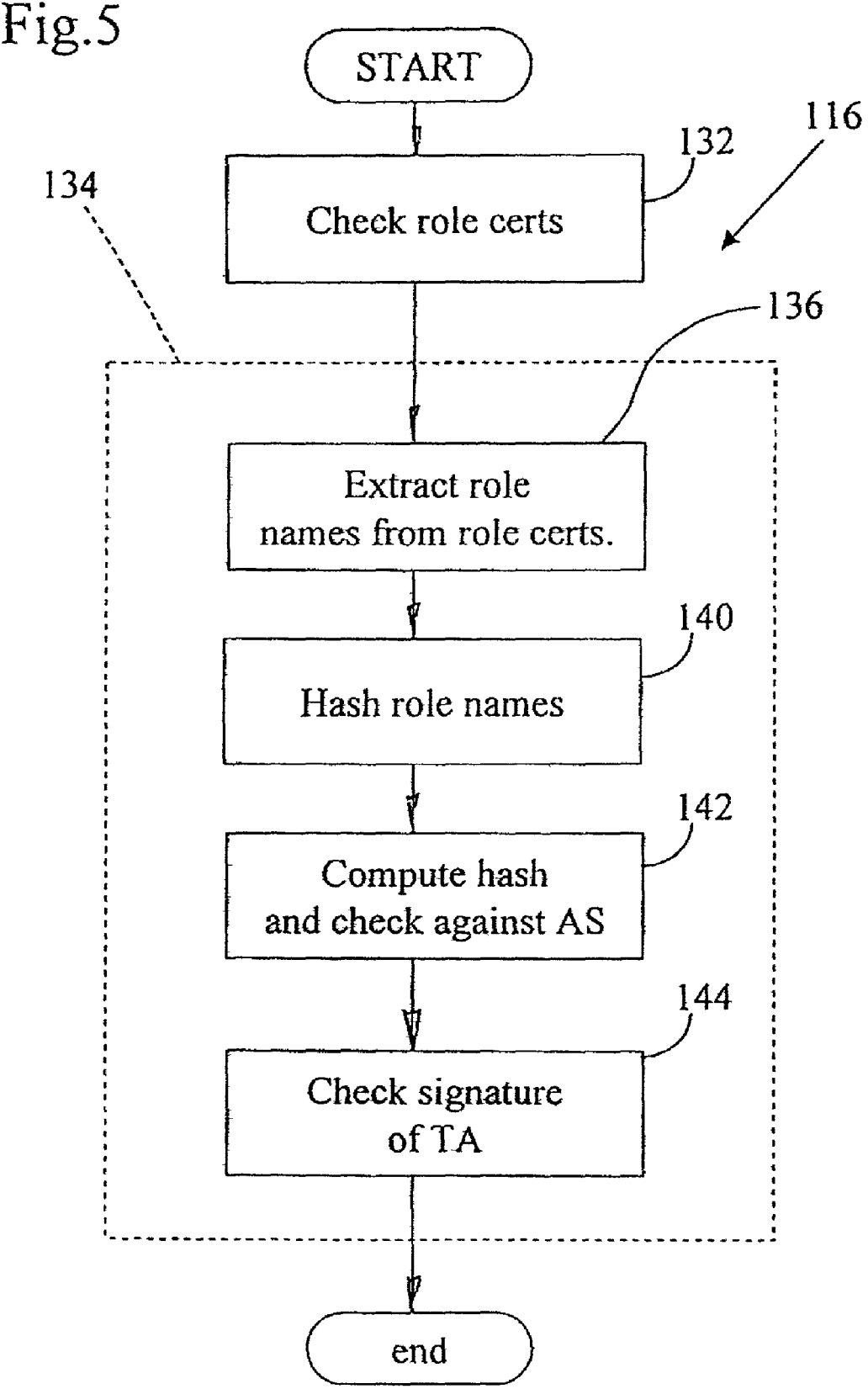
FIG. 5 is a flow chart of a verification submethod of the invention.

Referring now to FIG. 5, in order to accomplish the task of verification, the TAM 2 includes a verification submethod 116 that enables the verification of the created and signed document 114. In a first step 132, the role signatures 126, are checked on the document 114. In a second step 134, the transaction type itself is checked to ensure that it is an authorized transaction. In a substep 136 of the second step 134, the role names 122 are extracted from the role certificates 76. In a second substep 140 of the second step 134, the names 122 are hashed. In a third substep 142 of the second step 134, the computed hash value of the transaction 40 is checked to ensure that it is equal to the value of the transaction 40 received in the AS 94. In a fourth substep 144 of the second step 134, the signature 126 of the TA 80 on the transaction 40 is checked to ensure that it is correct. If so, the transaction 40 has been verified and notice of this fact is sent to the requester 42.

Thus, verification is simply the process of checking signatures, and that the verifier 130 is not concerned with the details 66 of the transaction 40. It is assumed that the signatories have checked the details 66 of the transaction 40 and would withhold their signature 106 if these details deviated from company policy in regard to transactions of the given type T. This assumption is again inherent in the form-signature model, where the verifier 130 is typically more concerned with the signatures provided as opposed to details of the signed form.

In the remainder of this detailed description, a travel request transaction is used to illustrate the steps of the TAM 2.

Figure 6:
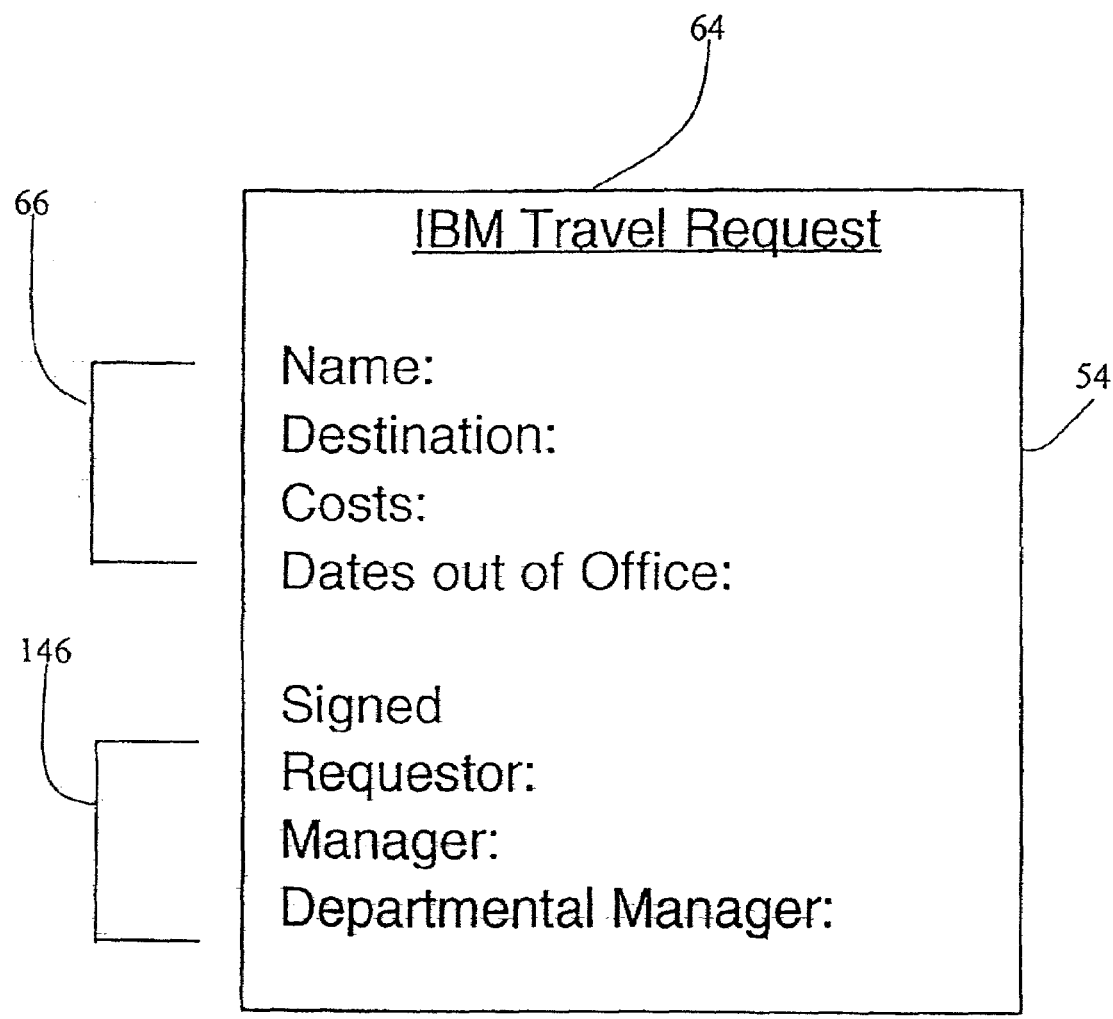
FIG. 6 is a schematic diagram of a travel request document used in the method.

Referring now to FIG. 6, the structure of an IBM travel request document 54 is shown. Traditionally, paper documents have been used for various transactions, in particular for authorizing a travel request. It is the task of a Transaction Authority 80 (<<TA>>) (shown in FIG. 7) to convert these paper forms into digital documents 64 (preferably in HTML form, although there are several possible formats). For each form, the TA 80 separates out what may be considered as transaction details 66, and what may be considered as authorization information 146. For the travel request document 54, the transaction details 66 include the requester name, destination, the trip cost, dates out of the office, etc. On the paper form, and the HTML document 64 constructed from it, most of the transaction details 66 are simply placeholders for information to be supplied by the requester 42.

The authorization details 146 generally consist of a list of roles 122 of persons who are required to jointly authorize the transaction 40. <<Authorizing>> the paper form usually means to sign it, and for the HTML document 64, the authorization details 66 will indicate which persons acting in which roles 122 may authorize the transaction 40. For the travel request document 54, the authorization details 66 that correspond to a permission set 100 for authorizing a travel request, consists of the electronic signatures 106 of the requester 165, a manager 167 and a departmental manager 169 (shown in FIG. 9) This means that the requester 42, a person acting in the role 122 of manager, and a person acting in the role 122 of departmental manager must digitally sign the HTML form 64 for it to be considered authorized.

Figure 7:
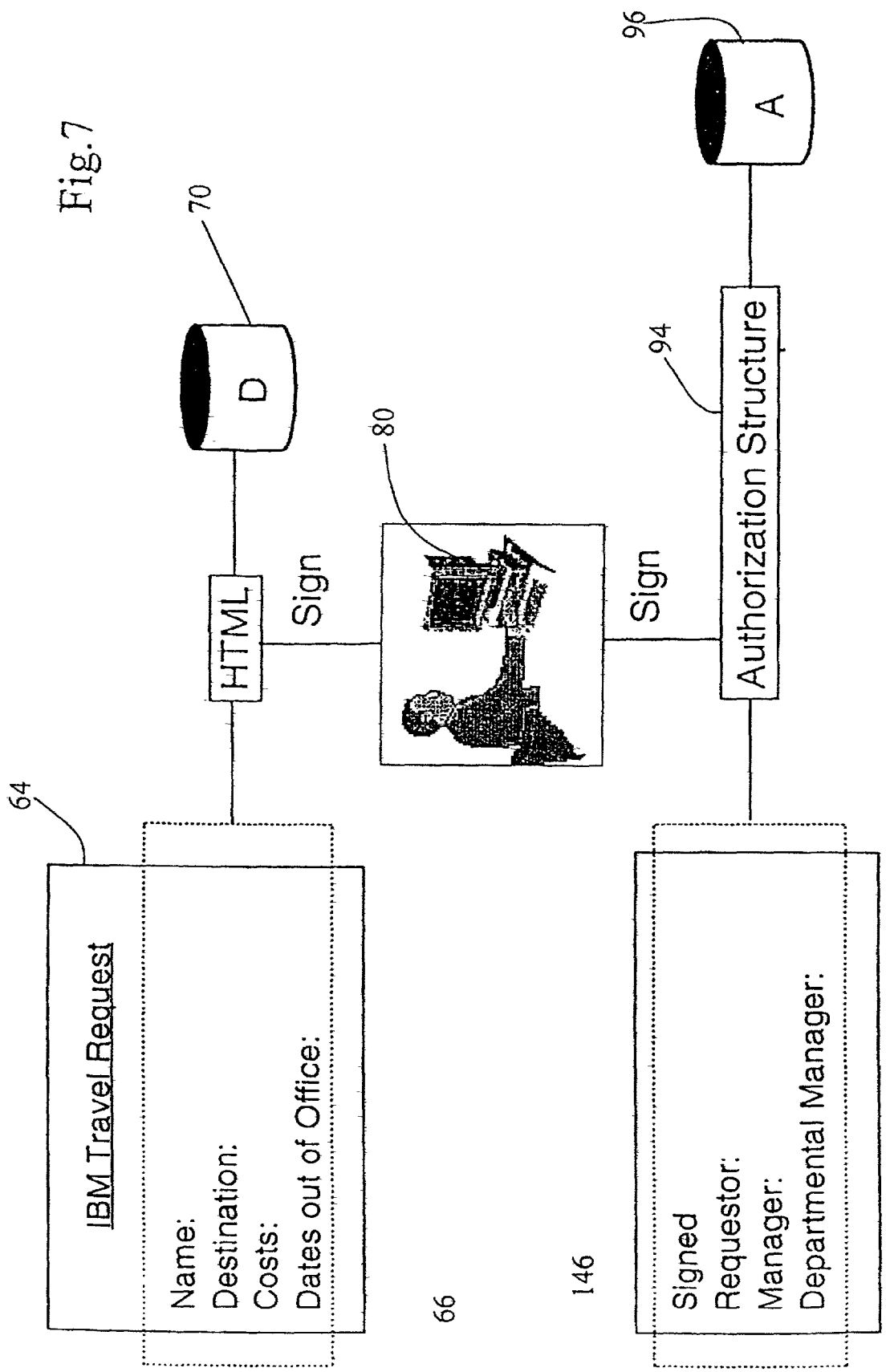
FIG. 7 is a block diagram showing the transaction authority of the method.

Referring now to FIG. 7, for the travel request document 64, the TA 80 creates the travel transaction details 66 in HTML, signs these details and stores the signed document in the Digital Document Database 70. Thus it is necessary to assign the role of the TA 80 to a person who is issued a TA role certificate 76 (shown in FIG. 8) that contains an associated signature verification key 120. The TA 80 will also be issued separately with the matching signing key 150. Signatures produced with the TA 80 signing key 150 are verified with the verification key 120 in the TA role certificate 76 (shown in FIG. 10).

The TA 80 creates the Authorization Structure 94 for the travel request document 64, signs the document, and then stores it in the Authorization Structure Database 96. The Authorization Structure 94 is a representation of the roles that may be used to authorize the transaction 40.

The information in the Digital Document Database 70 and the Authorization Structure Database 96 are not required to be secret as such. However, it is necessary that the information be integrity protected. For this reason, the TA 80 must sign such documents.

Figure 8:
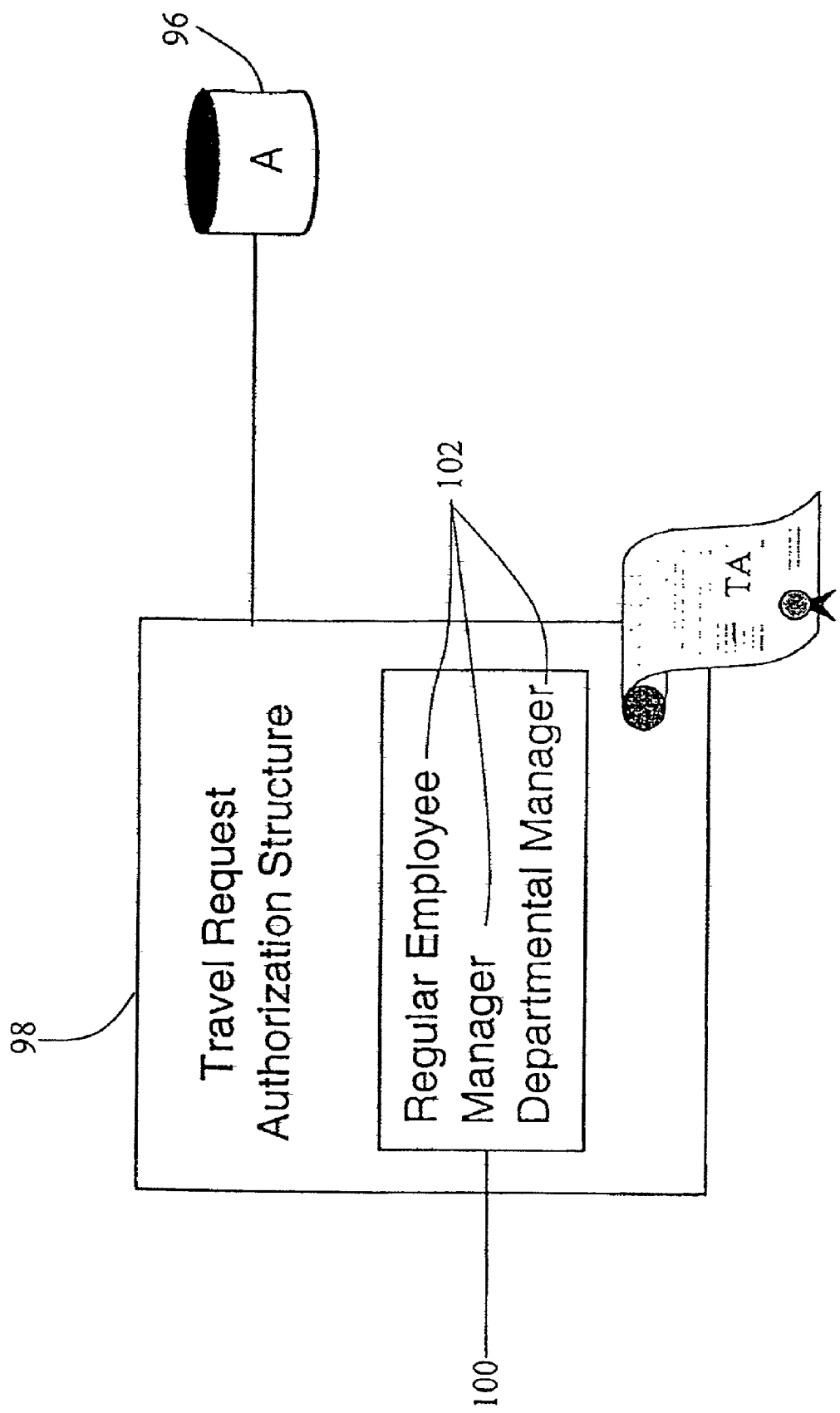
FIG. 8 is a block diagram showing the authorization structure of the method.

Referring now to FIG. 8, details regarding how the Authorization Structure 98 (<<AS>>) is created depend on social and strategic management factors that are not the subject of the invention. The main property of the AS 98 is that its construction depends on the concept of a permission set 100. To illustrate what is meant by a permission set 100, let the set PT,1={U, M, DH} be the permission set for transaction T. In this example, the transaction T has only one permission set, but in general a transaction may have several permission sets denoted PT,1, PT,2, ..., PT,i. Each permission set 100 consists of a set of roles 122 (that is, PT,i ⊂ R, potentially a multi-set), with the meaning that any user U is authorized for transaction T represented by D(T,U), if for some permission set PT,i={R1, R2, ..., Rm} of T, m users in the roles R1, R2, ..., Rm sign D(T,U) using their respective role certificates.

Permission sets 100, (PT,i), then represent sets of roles 122 whose joint authority is deemed sufficient to authorize transactions 40 of type T. A tree 154 (shown in FIG. 9) is used to represent the permission sets 100 PT={PT, 1, PT, 2, ..., PT, k}, of a transaction T. With respect to the form-signature model, PT describes the decision procedure for authorizing transactions of type T. U.S. Pat. No. 4,309,569 to Merkle, the content of which is incorporated by reference, describes the general use of such trees 154.

Referring now to FIG. 9, for each transaction type T, an authorization tree 154, AT, is created such that there are k nodes 156 at a first level 160 from the root 162, corresponding to the k permission sets 100, PT={PT, 1, PT, 2, ..., PT, i}, for transaction type T. The nodes at a second level 164 are leaves 166, and represent the roles 122 of each permission set 100.

If the permission sets 100, PT, for T are PT,1={R1, R2}, PT,2={R3, R4, R5} and PT,3={R6}, then AT 154 has two levels where the first level 160 represents PT,1, PT,2 and PT,3 with 3 nodes 156 and each PT,i 100 has the same number of leaves 166 as there are roles 122 in its permission set. So for example then PT,1 100 would have two children (both leaves 166) representing R1 and R2, as shown in FIG. 10.

Since transaction 40 is considered authorized if, for at least one permission set 100, PT,i, signatures are acquired for each role 122 in PT,i, the nodes 156 representing the PT,i may be considered as "AND" nodes 170 and the root 162 of AT 154 as an "OR" node 172. An AND node 170 means that all children of the node must agree to the request D(T,U) (all roles 122 of a permission set 100 must sign) while an OR node 172 means at least one child must agree to the request D(T,U) (at least one permission set must jointly sign). Alternatively, AT 80 may be interpreted as a disjunctive representation of the roles 122 that can authorize a transaction 40.

Referring again to FIG. 8, with the travel request document 64, the permission set 100 consists of the requester 42, a manager and a departmental manager. These will be described in more detail later.

Figure 10:
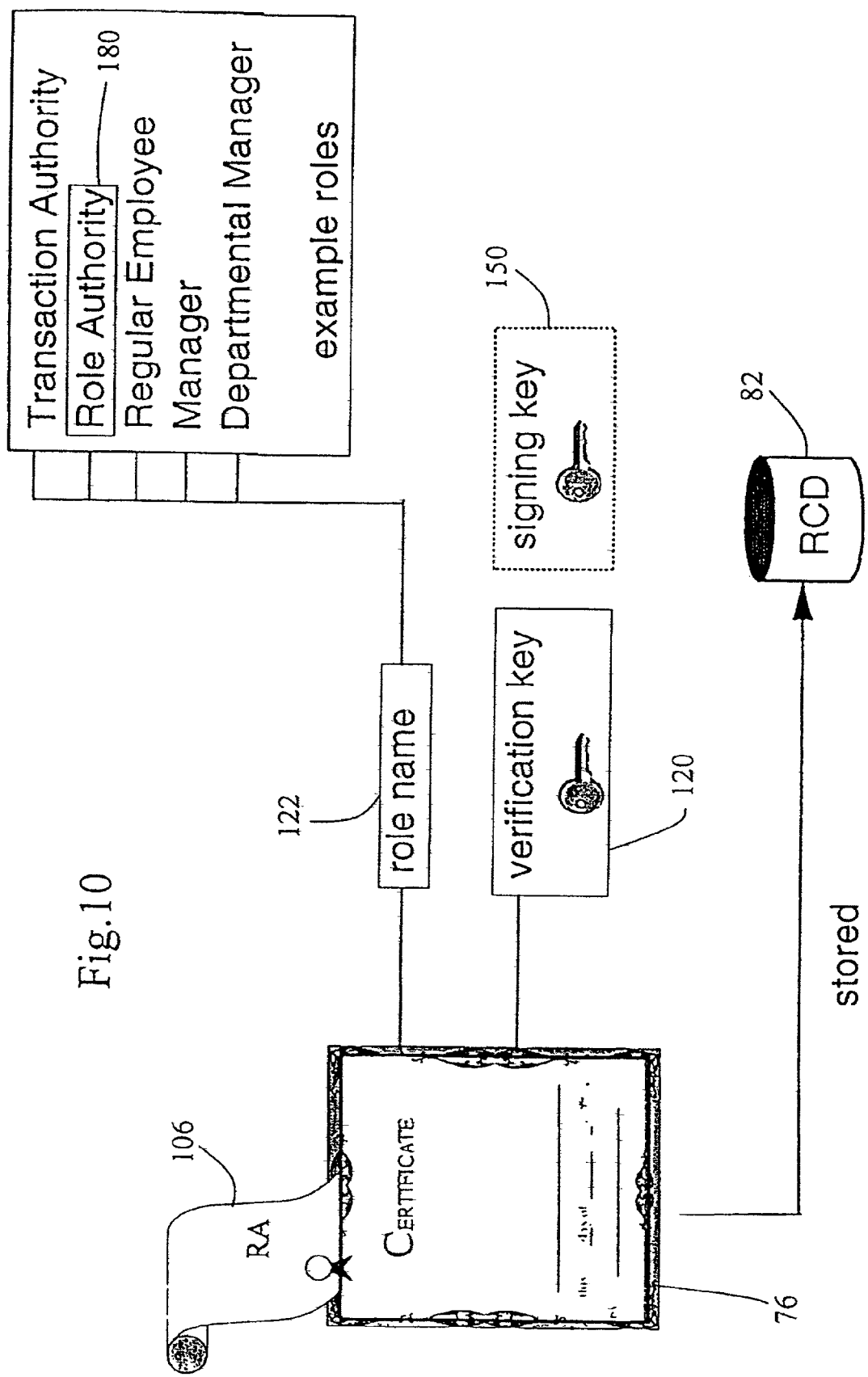
FIG. 10 is a block diagram showing an interaction of the method with role certificates.

Referring now to FIG. 10, since the AS 98 is based on permission sets 100, and these sets consist of named roles 122, each user will be issued with one or more roles designated by a role name. Since users are required to sign in their capacity under a given role name 122, users are then issued with role certificates 76. A role certificate 76 consists of the role name 122, a signature verification key 120, a Role Manager signature 106 on the role certificate 76, and other administrative information (such as time at which the role certificate was issued, when it will expire etc.). When a user is given a role certificate 76, there is also given the corresponding signing key 150 that matches the verification key 120 in the role certificate. In fact, a user demonstrates that he owns a given role certificate 76 by possessing the corresponding signing key 150. Consequently the signing key 150 must be kept secret by the user it is issued to. Each signed role certificate 76 is also stored in the role certificate database 82 (<<RCD>>).

The above completes the initialization of the method 2 of the invention. In summary, the initialization involved the conversion of paper forms into digital documents 64, and their signing by the Transaction Authority 80. Further, the TA 80 also determined the Authorization Structure 98 (AS) for each transaction 40, and has signed this AS as well. The information in the AS 98 is based on named roles and the Role Authority 180 issues each user with one or more role certificates 76. The set of named roles 122 issued by the Role Authority 180 were used by the TA 80 in the construction of the AS 98.

Figure 11:
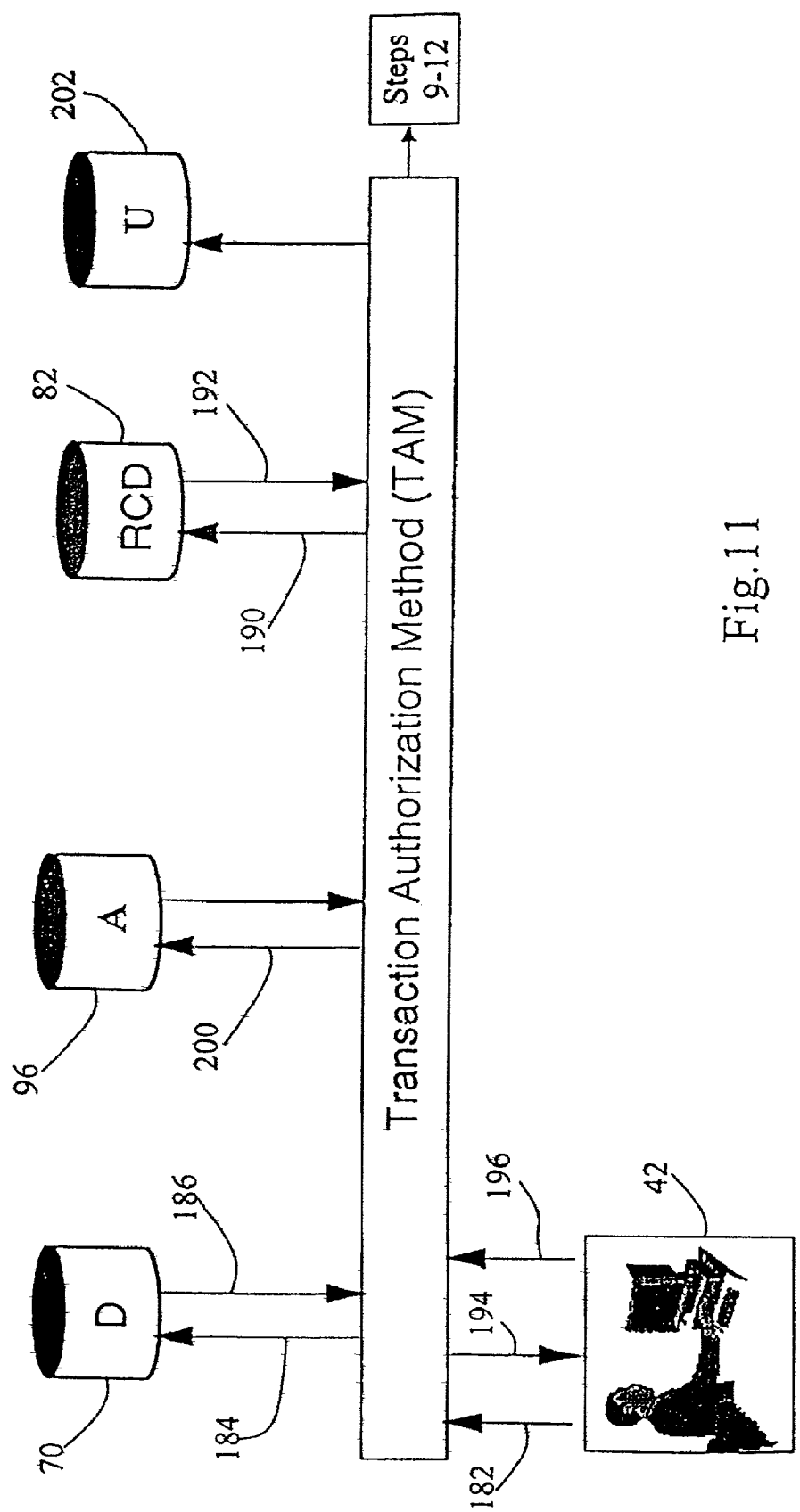
FIG. 11 is a block diagram showing the interaction of the TAM with various databases in the method.

Referring now to FIG. 11, an example of authorizing a travel request 64 is considered. Assume a user wishes to make a travel request and have it authorized. The user, the requester 42 of the travel authorization, will accomplish this through the help of the TAM 2. In the preferred embodiment, the TAM 2 is a server application on the company intranet 25, and can be contacted via a Web interface such as a browser. The user thus is able to contact the TAM 2 via its URL and indicates that he/she wishes to make a travel request 64. Here, the travel request requester 42 is acting in the role 122 of <<regular employee>>.

In a first step 182, the user/employee 42 requests a travel request transaction 40 from the TAM 2. The TAM 2 receives the travel request 52 from the user 42, and contacts the Digital Document Database 70 to obtain a copy of the transaction details 66 for this class of transaction 40. The Digital Document Database 70 returns the details 66, represented in HTML, to the TAM 2. The HTML was previously signed by the Transaction Authority (TA) 80.

In the second step 184, the TAM 2 requests the HTML representation 64 of the transaction details 66 from the Digital Document Database 70. To check that the HTML details are correct, the TAM 2 requests the role certificate 76 of the TA 80 from the Role Certificate Database 82 (which also includes role certificates of a <<regular employee>>

165, a <<manager>> 67, <<department manager>> 169 and other roles of employees and management at differing levels within the company), and then verifies the signature 106. If the signature 106 is correct, the TAM 2 proceeds.

In a third step 186 the Digital Document Database 70 returns the HTML representation 64 of the travel request transaction details 66.

In a fourth step 190, the TAM 2 requests the role certificate 76 of the TA 80 from the Role Certificate Database 82. In a fifth step 192, the Role Certificate Database 82 returns the certificate 76 of the TA 80 and the TAM 2 verifies the signature 106 of the TA on the HTML representation 64 of the transaction request details 66, returned from the Digital Document Database 70.

In step six 194, the TAM 2 returns the HTML transaction details 66 to the requester 42, and the requester's browser displays the details as a HTML form 64 that is requesting input. The requested input constitutes the transaction details 66 for the travel request 54. In step seven 196, the requester 42 views the HTML representation 64, completes the details 66 specified (e.g., name, destination, costs, etc.) through the browser, signs the completed HTML representation 64. The user/requester 42 has signed with their role certificate 76 that indicates the role <<regular employee>>. The requester 42 returns this signed HTML representation 64 to the TAM 2 to collect any remaining signatures 106.

In an eighth step 200, the TAM 2 receives the signed requester input (i.e., the signed HTML representation) from the user 42, and then contacts the Authorization Structure Database 96 to obtain the authorization structure 98 for the travel request transaction 40. The TAM 2 receives the authorization structure 98 from the database 96 and checks the signature 106 of the TA 80 on the structure. From the authorization structure 98, the TAM 2 extracts a permission set 100 of role names 122, and a collection of users to contact to sign in these role names. In this case there is only one, which is the regular employee/requester 42, manager and departmental manager.

At this point, the object of the TAM 2 is to obtain a collection of signatures 106 from persons whose joint roles 122 constitute a permission set 100. The requester 42 has already provided the signature 106 for the role <<regular employee>>, and the TAM 2 must obtain two signatures in the roles <<manager>> 167 and <<departmental manager>>.

The TAM 2 accesses a User Directory Database 202 that lists users and their roles 122 and, for example, selects user <<John Brown>>; in role <<manager>> for one signature 106, and user <<Sue Smith>> in role <<departmental manager>> for the other signature.

In step nine, the TAM 2 forwards the transaction request details 66 with the signature 106 of the regular-employee requester 42 to a manager of the requester, John Brown. John Brown's browser displays the HTML travel form 64 with the requester's transaction details 66 filled in, and an indication that the signature 106 provided by the requester 42 is correct. John Brown then decides whether to authorize the travel request 54. If authorization is granted, John Brown signs the HTML of the travel request 54, and the travel details 66 provided by the requester 42, which are returned to the TAM 2.

In step ten, the TAM 2 forwards the transaction request document 64 with the signatures 106 to the <<department manager>> Sue Smith, who is presented with the details 66 of the travel request 54 and the set of previous signatures on the request (in this case the signature by the requester 42 and that of John Brown). If all is in order, Sue Smith then signs all the information she received in her role as department manager, and sends this back to the TAM 2.

Figure 12:
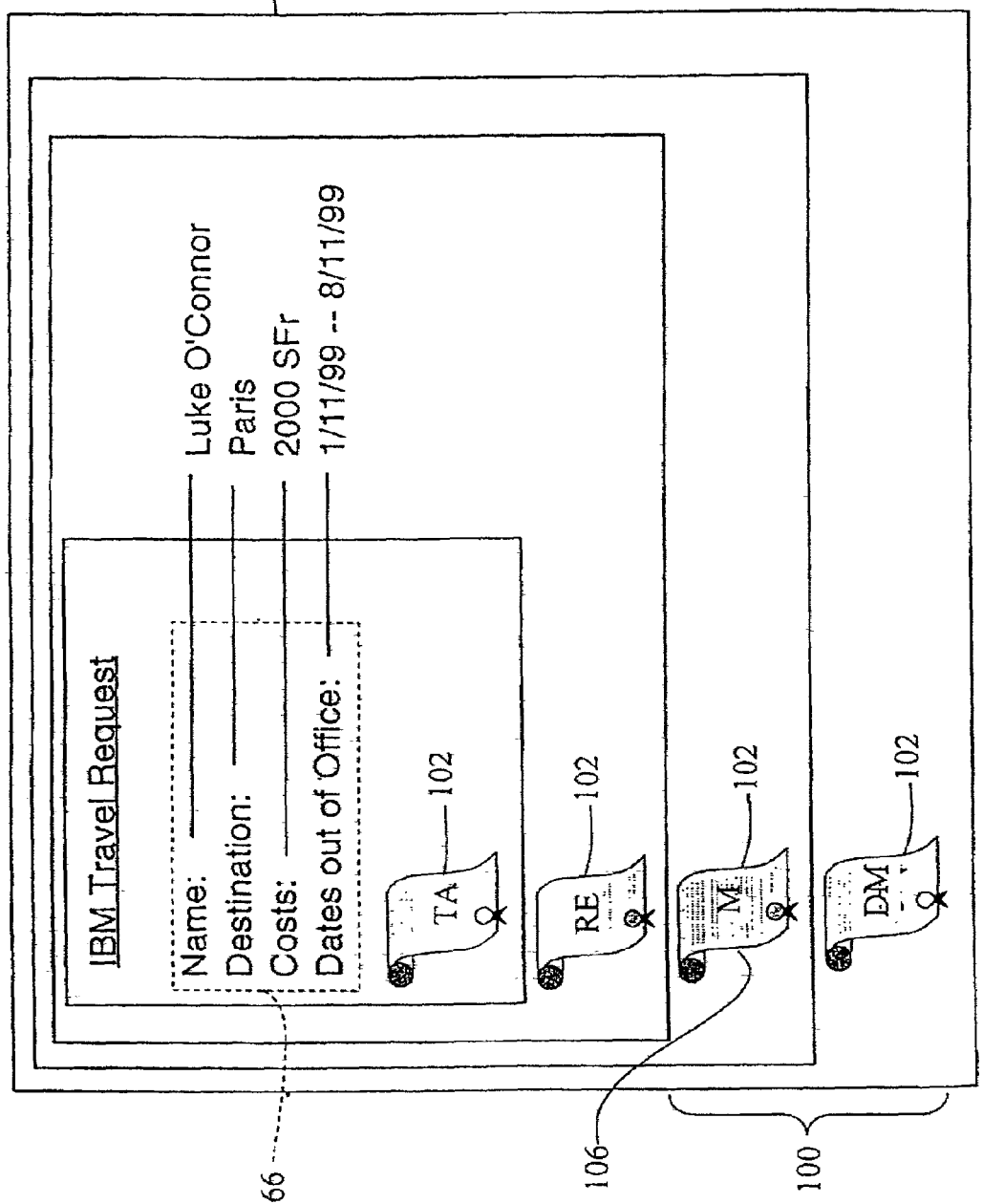
FIG. 12 is a schematic diagram of the completed travel request.

In step eleven, the TAM 2 receives a set of signatures 106 that purport to constitute a permission set 100. To check that this is in fact the case, the TAM 2 retrieves the role certificates 76 for the requester 42, John Brown as Manager and Sue Smith as Departmental Manager, and then verifies all the signatures. In step twelve, if the signatures 106 verify as being valid, the TAM 2 forwards the document 64 including the signatures and role certificates 76 to the requester 42. Thus, a digital document 114, shown in FIG. 12, is created including all the authorization details 66 required in order to confirm the validity of the transaction 40. The requester 42 now holds a set of signatures 106 on a travel request that constitute a permission set 100 for this class of transaction 40. This information is to be used in convincing another user, denoted as a verifier 130, that the requester 42 is in fact authorized to make the travel request 54.

Referring now to FIG. 12, the completed transaction 40 is depicted, having transaction details 66 and the signatures 106 held by the requester 42, including (1) the HTML of the transaction details signed by the TA 80, (2) the user-supplied input, both of which are signed by the requester 42, and (3) this information being over-signed by the a manager, and all being over-signed by a departmental manager.

Figure 13:
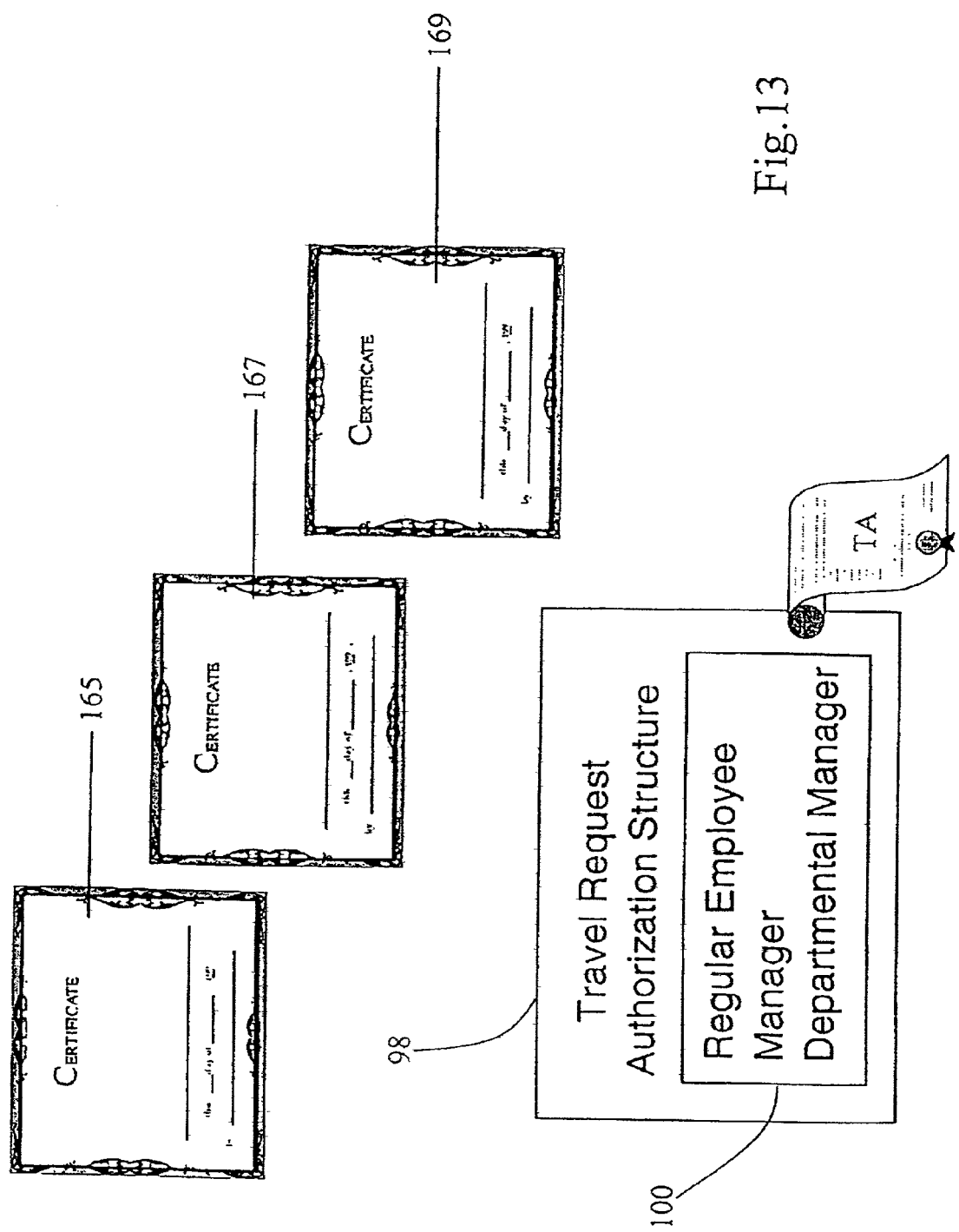
FIG. 13 is a schematic diagram showing the role certificates in the travel request.

Referring now to FIG. 13, the role certificates 76 and authorization structure 98 held by the requester 42 are shown.

Figure 14:
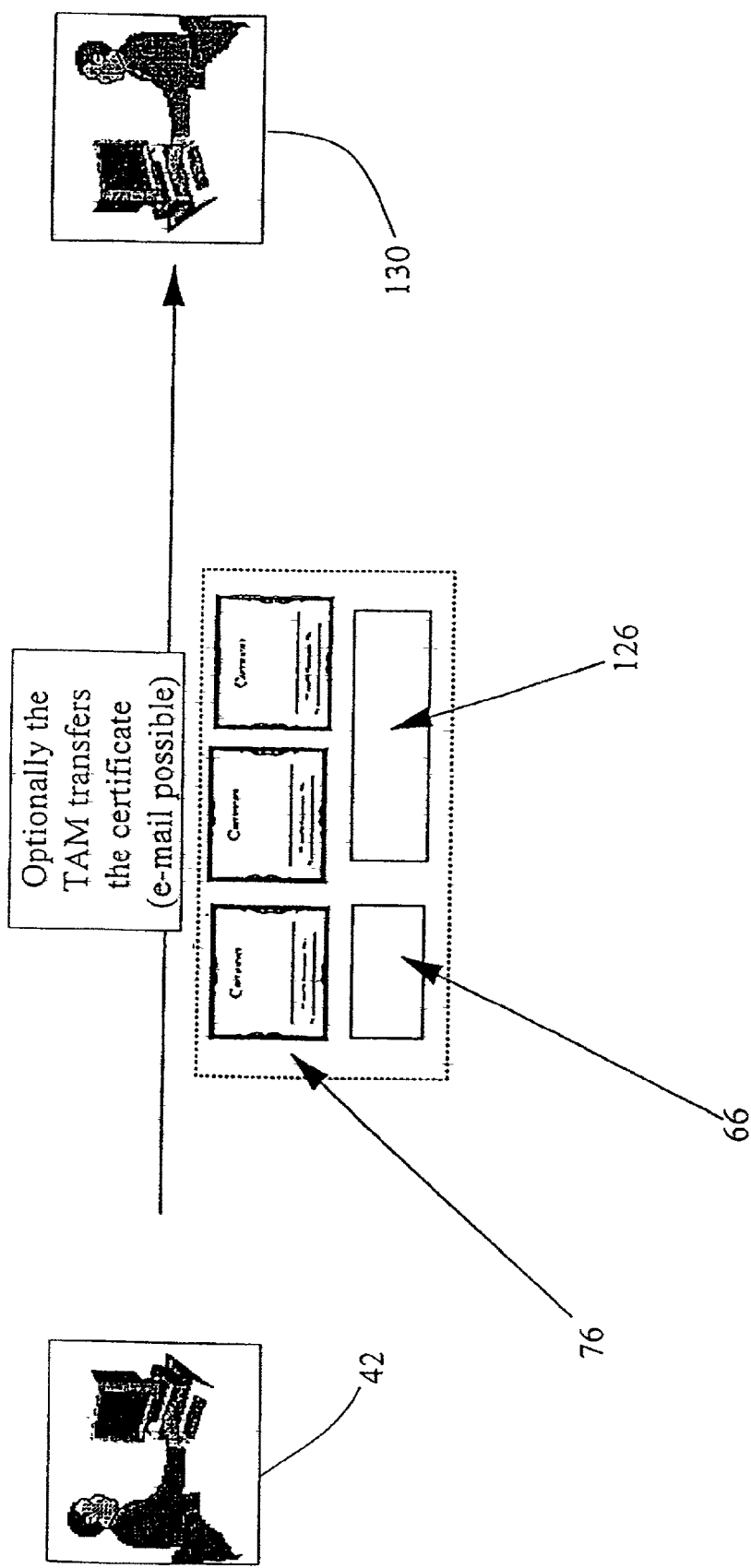
FIG. 14 is a schematic diagram showing the transfer of the request to the verifier.

Referring now to FIG. 14, the steps involving requester 42 forwarding the travel request 54 to the verifier 130, for transaction processing, is discussed. This method is called a verification submethod 116.

To better understand this method of verification, it is important to understand details of how the Authorization Structure 98 is constructed. The verification submethod 116 makes use of cryptographic hash functions, which map arbitrary strings to fixed length outputs of say 16 or 20 bytes. In the case of the travel request 54, the Authorization Structure 98 is constructed by hashing the three roles 122 (thus hashing the actual authorization structure of the company) that constitute the permission set to yield: H1=hash(<<regular employee>>); H2=hash(<<manager>>); and H3=hash(<<departmental manager>>).

For example, H1 is said to be the hash of the string (<regular employee>>. Finally, H1, H2, and H3 are treated as strings, concatenated and then hashed as T=hash(H1, H2, H3). The phrase is "the Transaction Authority 80 (TA) signs the Authorization Structure 98", means that the TA signs the value of T" the transaction 40. Thus the TA 80 is signing a "hash of hashes".

All users are aware of this general method for signing an Authorization Structure 98 (AS), in that they know that the AS signed by the TA 80 is derived from first hashing a collection of roles 122, and then hashing these values once more.

Referring specifically to the travel request example, the requester 42 sends (1) the travel request 54 in HTML signed by the TA 80; (2) three role certificates 76 corresponding to three users in roles <<regular employee>>, <<manager>> and <<departmental manager>>; (3) the transaction details 66 as shown in FIG. 12 which are first signed by the regular employee, then the manager, then the departmental manager; and (4) the signature 106 on the hashed roles 122 as created in FIG. 15.

Referring again to FIG. 5, the TAM 2 includes a verification submethod 116 that enables the verifier 130 to verify the created and signed document 114. The verifier 130 is primarily interested in verifying that the requester 42 is authorized to make the transaction 40, which in this case is a travel request 54. The requester 42 sends to the verifier 130 the transaction HTML (signed by the TA 80), a collection of role certificates 76, the transaction details 66 signed by each of the signing keys 150 corresponding to the verification keys 120 in the role certificates, and the Authorization Structure 98. Recall from FIG. 8 that each role certificate 122 is signed by the Role Authority 180 (RA). In a first step 132, the verifier 130 uses the verification key 120 of the RA 180 to check each certificate 76 on the document 114. In a second step 134, the verifier 130 then checks the signatures 106 on the transaction details 66 using the verification keys 120 in the supplied role certificates 76. In a substep 136 of the second step 134, to check that the requester 42 is authorized, the verifier 130 extracts the named roles 122 from the role certificates 76 In a second substep 140 of the second step 134, the names are hashed using the hash-of-hashes process (as described above). In a third substep 142 of the second step 134, the computed hash value of transaction 40 is checked against that was originally signed by the Transaction Authority 80 to ensure that it is equal to the value for transaction 40 received in the AS 98. The output of the hash-of-hashes process is then used as input to check the signature 106 on the hash-of-hashes process. In a fourth substep 144 of the second step 134, if the produced hash-of-hashes string matches the hashed string signed by the TA 80, then the verifier 130, assumes that the request 52 is authorized. If so, the transaction 40 has been verified and notice of this fact is sent to the requester 42.

In the above submethod 116, the TAM 2 transfers the information from the requester 42 to the verifier 130. Optionally, the transfer from the requester 42 to the verifier 130 may be done via e-mail. The requester 42 gathers all the authorization details 66 locally using the TAM 2 and then sends all this information via e-mail to the verifier 130. For instance, all the signatures 106 and costs are gathered and then the request 52 is e-mailed to a travel agent who proceeds to make the booking.

As of yet, it has not been assumed that the requester 42 and the verifier 130 are in the same company. This is not necessary because the method 2 functions regardless of whether the verifier 130 is in the same company or not. If they are in the same company, they may be connected by the intranet 25 and thus share the same server 54a. The location of the verifier 130 is not important as such. The role 122 of the verifier 130 is to verify the information provided by the requester 42.

In order to verify the validity of the transaction 40, the verifier 130 needs the following:

(1) the signature verification key 120 of the Role Authority 180 that is used to check the correctness of the signatures 106 on the role certificates 76 used in the transaction 40;

(2) the signature verification key 120 of the Transaction Authority 80 to check the correctness of the signature 106 on the Authorization Structure 98 (the hash-of-hashes process); and (3) knowledge of how to take a collection of named roles 122 and perform the hash-of-hashes process so that the signature of the Transaction Authority 80 on the Authorization Structure 98 can be checked.

The signature verification keys 120 of the Role Authority 180 and Transaction Authority 80 are public information, in that they need not be made secret. Therefore, they are assumed to be available and thus verifiable by all. The hash-of-hashes process needs to be understood by all potential verifiers 130 using the method 2 of the invention.

The hash-of-hashes process is quite simple in the example of the travel request 54 given above, because there is only one permission set 100. However, the basic method 2 can be extended as follows to include several permission sets 100. For example, a travel request 54 can also be authorized by the CEO and the CEO secretary, so that the two permission sets (P1 and P2) for a travel request are P1={regular employee, manager, departmental manager}; P2={CEO, CEO secretary}.

The permission sets 100 and the roles 122 they consist of can be arranged into an Authorization Tree 154 (AT), as shown in FIG. 9. The AT 154 is an example of an Authorization Structure. For the Transaction Authority 80 to sign the AT 98, the AT must first be converted into a string, which is done by using a hash-of-hashes process similar to that described above.

First, each role name 122 is hashed to give H1, H2, H3, H4, H5 as follows:

H1=hash(<<regular employee>>)
H2=hash(<<manager>>);
H3=hash(<<departmental manager>>);
H4=hash(<<CEO>>);
H5=hash(<<CEO secretary>>).

These values must now be hashed in order to obtain one hash for each permission set, as follows: H6 =hash(H1, H2, H3); and H7=hash(H4, H5). H6 is the hash for permission set P1, and H7 is the hash (P2') on permission set P2. Thus there is one hash for each permission set 100; these are called permission set hashes. Note that hash(H1, H2, H3) means that H1, H2, and H3 are strings that are concatenated and then hashed. Finally, the hash for the tree is produced as T=hash(H6, H7).

Figure 15:
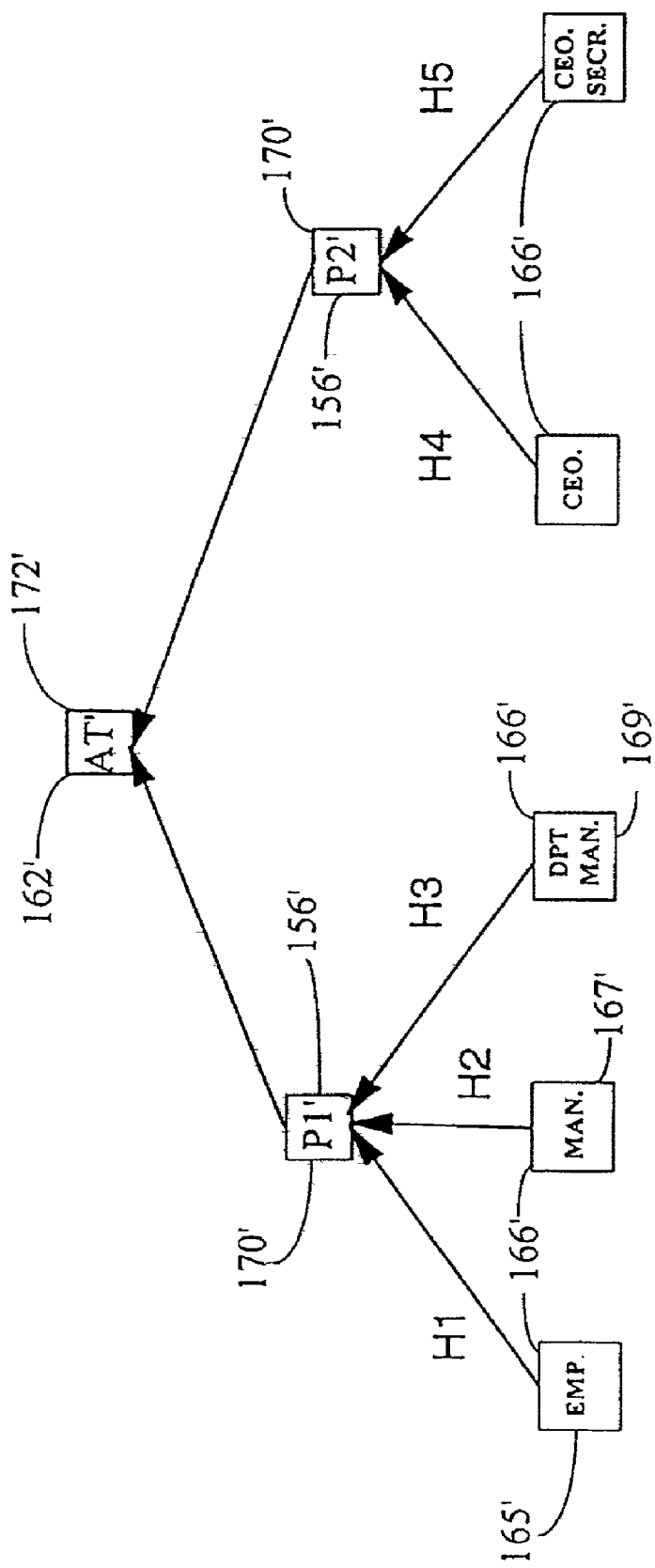
FIG. 15 is a hash of the tree of FIG. 9.

This hashing process is represented in FIG. 15. It is the value of transaction 40 that is signed by the Transaction Authority 80.

The verifier 130 uses a signature on transaction 40 to check that a requester 42 is authorized for a given transaction 40 (travel request 54 in this case) in a similar manner as in the example given above with one permission set 100.

To verity the signature 106 on transaction 40, the verifier 130 repeats all or part of the tree hashing process described with respect to FIGS. 9 and 15. Note that in FIG. 15 , hashed referenced items are differentiated from those of FIG. 9 by means of a prime following the unhashed referenced number. Assume that the requester 42 has obtained signatures 106 from persons acting in roles that constitute permission set P1. In this case, the requester 42 will be sending the verifier 130 three role certificates 76 from which the verifier can extract the roles names <<regular employee>>, <<manager>>, and <<departmental manager>>. The verifier 130 can then form H1, H2, H3 and H6 as described above. Thus the verifier 130 can form the permission set hash of the permission set 100 that authorized the transaction 40.

To complete the signature verification on the Authorization Tree 154, the requester 42 will need to provide the verifier 130 with the permission set hashes of all other permission sets 100 besides the one that is authorizing the transaction 40. In the example above, because P1 is authorizing the transaction 40, then the hash of P2 must be provided, which in this case is equal to H7 as described above.

When given H7, the verifier 130 can now form T because the verifier can form H6, and the signature 106 on T can be checked. Thus, for the purposes of checking the signature 106 on the Authorization Tree 154, the requester 42 sends the verifier 130 role certificates 76 from which roles 122 can be extracted and hashed to form the hash of the permission set 100 that is authorizing the transaction; and the hash of each permission set that is not authorizing the transaction. With these two pieces of information, the verifier 130 can compute the hash value of transaction 40 and then check the signature 106.

In the travel request above, the TAM 2 is contacted through the World Wide Web, and thus the TAM can be thought of as a web server process. In the workflow system of the method, users preferably contact the TAM through a dedicated network channel. Both embodiments are essentially identical: the TAM 2 exists somewhere on the computer system 20 which can be accessed by users; the TAM can also access databases 70, 82, 46 and 202, and other users. As understood in the prior art, this may be accomplished by e-mail or via an intranet or Internet connection to the web, for example.

The TA 80 is trusted by the requester 42 and verifier 130 in that the signatures 106 produced by the TA are trusted. In this sense, the TA 80 is trusted to correctly form the HTML representation 64 of the transaction 40 and sign it, and to also form the Authorization Structure 98 for a transaction and sign it. However, in a broader sense, the TAM 2 need not be trusted. Although a user may trust the TAM 2 to perform some security functions on their behalf, the user may instead use a local process to verify that all the work performed by the TAM is correct.

In the web embodiment, the TAM 2 is neutral (i.e., trusted by all) in that it is an independent server 54b accessible by both verifiers 130 and requesters 42 on the Internet 31. Specifically, the components in which trust really resides is with the Transaction Authority 80 (to create digital transactions, to create Authorization structures), and the Role Authority 180 (to allocate role certificates 76 to persons who can act in the stated role). Thus, the verifier 130 need only trust the signatures 106 produced by the Transaction Authority 80 on the HTML representation 64 and Authorization Structure 98, and the Role Authority 180 for signatures on the role certificates 76.

In the travel request 54 described above, the TAM 2 is performing a trusted role on behalf of the requester 42 since the TAM is fetching information and checking signatures 106. However it should be clear that all information sits in public databases (the Digital Document Database 70, the Authorization Structure Database 96 and the Role Certificate Database 82) resident on the server 54b, for example. The requester 42 could access the Digital Document Database 70 and get the travel request HTML document 64 directly, and check the signature 106 of the TA 80 on it (the verification key 120 of the TA 80 is available to everyone). The requester 42 could then contact users for signatures 106 to form a permission set 100, check the signatures by accessing the Role Certificate Database 82 and so on.

It should be clear that when the TAM 2 performs the database fetching and signature collection, this, besides being how the method works in practice, is simply a convenience for the requester 42. If convenience and not trust is the overriding consideration to a user, then the TAM 2 need not be trusted by all parties.

As mentioned above, the main distinction between intra-enterprise and inter-enterprise authorization is that, in the former case, the company is less concerned about revealing its authorization structures 98 to the verifier 130. In the inter-enterprise context, the authorization structure is the authorization tree 154 for a given task, and thus access to the database containing the collection of all authorization trees, should be restricted to users outside the company.

There are several ways to adapt the method 2 as already described to an inter-enterprise scenario. Returning to our original example of a transaction 40 between companies A and B, represented by users UA and UB respectively, the most direct approach would be for each company to have an enterprise authority EA, with a public key that can be used to verify signatures 106 produced by the EA on behalf of the company. The EA authorizes all inter-enterprise transactions by being the verifier 130 of all transactions originating in the company; if a transaction is authorized, then the EA signs a statement to this effect which can be verified by a user in another company.

Further, although the TAM 2 preferably operates within the distributed workflow management system 6, the method may simply consist of a message exchange mechanism. In this embodiment, the message exchange mechanism that does not operate as a traditional workflow management system 6, but instead, manages electronic message flow such as e-mail with attachments or HTML e-mail between the requester 42 and persons having certain roles within the company. The management of such a mechanism being realized through something as simple as PC-resident role-based programs (i.e., programs customized to suit the particular role of the user 8) using file-server type databases (analogous to databases 70, 96, 82 and 202 shown in FIG. 11) and pull down menus and submenus organized so as to follow the relational structure of the databases. A typical menu item is, for example "transaction type", which opens a submenu listing different types of transactions (such as "travel request"). Activating a particular transaction 40 can open another submenu showing the permission sets 100 required for such transaction. Activating a permission set 100 then opens up an e-mail having transaction details 66 in an attachment. The e-mail is pre-addressed to all those persons in the permission set 100, making further distribution for signature and verification simple.

The embodiment using the hash of the authorization tree 154 described in FIG. 15 has the advantage that the verifier 130 learns only a small amount of information about the decision structures of the user's company, except that a user in role UR can request a transaction 40. On the other hand, the EA server becomes a potential bottleneck, as every inter-enterprise request must go to EA for verification and signature. An alternate solution is to make the authorization trees 154 available outside the company on the public Internet 31 for the purposes of verification by other companies. The main problem of course is that by revealing an AT 154 directly, much information about the decision process within a company is revealed. In the next section, several modifications to the method 2 that makes it more suitable for inter-enterprise authorization.

For example, instead of having to obtain direct approval of every transaction 40 from an enterprise authority (i.e., Transaction Administrator 80 for confirmation that the lower level employees had authority to authorize the transaction, the enterprise authority need only approve of an authorization structure 98. Now, verification of authorization need not always go to through the enterprise authority—rather, the authorizations need only fulfill the requirements of the authorization structure 98.

In another advantage, once the TA 80 has created transactions 40 and authorization structures 98, and the RA 180 has created role certificates 76, the system 20 becomes very reliable in that contracts created using the method 2 can easily and automatically be verified.

It should be understood that the method 2 functions with one-role permission sets 100. However, an advantage of further reliability in the authorization result is obtained where more than one role 122 is specified in a permission set 100. Further, a lower resource-intensive embodiment of the method 2 may be obtained by providing for the extraction and verification of a single, say, the first listed role certificate 76 in a permission set 100 comprised of several roles 122. Defining the structure of a permission set 100 such that the role certificate 76 of the higher-level employee is listed first, improves the reliability of this embodiment. Nevertheless, such an embodiment is inherently less reliable as compared to an embodiment that extracts and verifies all of the role certificates 76, as well as the role content of the permission set 100 itself (i.e., that the role certificates 76 on a transaction 40 do indeed correspond to the specific roles 122 required to authorize the transaction).

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

Having thus described the invention, what is claimed is:

1. A computerized method having a process flow operating over a computer network comprising a plurality of interconnected computers and a plurality of resources, each computer including a processor, memory and input/output devices, each resource operatively coupled to at least one of the computers and executing at least one of the activities in the process flow, the method comprising the steps of:
   automatically assembling an electronic authorization of a transaction comprising an electronic representation of the transaction and a plurality of verifiable anonymous role certificates to be completed comprising at least one verifiable anonymous role certificate to be completed for each of a plurality of roles for which approval is required to obtain authorization of the transaction;
   distributing said electronic authorization for completion of said plurality of role certificates;
   extracting completed verifiable role certificates from said electronic authorization; and
   verifying whether completed role certificates, associated with the authorization, are themselves authentic.

2. The method of claim 1 wherein roles associated with the role certificates are hashed and compared with hashed roles in a database of hashed roles.

3. The method of claim 1 wherein the authorization is further insured by verifying that role certificates associated with the authorization correspond with roles in a permission set of roles of an authorization structure, the role certificates of which being required to authorize the transaction.

4. The method of claim 3 wherein the authorization structure is an authorization tree.

5. The method of claim 3 wherein the roles are extracted from the role certificates associated with the transaction, each extracted role being hashed and these hashed roles being concatenated and hashed again, and then concatenated with hashes of other permission sets, if any, according to the authorization structure and hashed once again, resulting in a computed hash value which may be compared to that which was signed by the Transaction Administrator, a match indicating that the transaction is authorized.

6. A distributed workflow management system, the management system operating over a computer network comprising a plurality of interconnected computers and a plurality of resources, each computer including a processor, memory and input/output devices, each resource operatively coupled to at least one of the computers and executing at least one of the activities in a process flow, the system comprising:
   means for automatically assembling and distributing an electronic authorization of a transaction comprising an electronic representation of the transaction and a plurality of verifiable anonymous role certificates to be completed comprising at least one verifiable anonymous role certificate to be completed for each of a plurality of roles for which approval is required to be completed to obtain authorization of the transaction;
   means for extracting completed verifiable role certificates from said electronic authorization; and
   means for verifying whether completed role certificates, associated with the authorization, are themselves authentic.

7. The system of claim 6 wherein roles associated with the role certificates are hashed and compared with hashed roles in a database of hashed roles.

8. The system of claim 6 wherein the authorization is further insured by verifying that role certificates associated with the authorization correspond with roles in a permission set of roles of an authorization structure, the role certificates of which being required to authorize the transaction.

9. The system of claim 8 wherein the authorization structure is an authorization tree.

10. The system of claim 8 wherein the roles are extracted from the role certificates associated with the transaction, each extracted role being hashed and these hashed roles being concatenated and hashed again, and then concatenated with hashes of other permission sets, if any, according to the authorization structure and hashed once again, resulting in a computed hash value which may be compared to that which was signed by the Transaction Administrator, a match indicating that the transaction is authorized.

11. A computerized method having a process flow operating over a computer network comprising a plurality of interconnected computers and a plurality of resources, each computer including a processor, memory and input/output devices, each resource operatively coupled to at least one of the computers and executing at least one of the activities in the process flow, the method comprising the steps of:
   obtaining an electronic authorization of a transaction comprising an electronic representation of the transaction and a plurality of verifiable anonymous role certificates to be completed comprising at least one verifiable anonymous role certificate to be completed for each of a plurality of roles for which approval is required to be completed to obtain authorization of the transaction;
   extracting completed verifiable role certificates from said electronic authorization; and
   verifying whether completed role certificates, associated with the authorization, are themselves authentic.

12. The method of claim 11 wherein roles associated with the role certificates are hashed and compared with hashed roles on a database of hashed roles.

13. The method of claim 11 wherein the authorization is further insured by verifying that role certificates associated with the authorization correspond with roles in a permission set of roles of an authorization structure, the role certificates of which being required to authorize the transaction.

14. The method of claim 13 wherein the authorization structure is an authorization tree.

15. The method of claim 13 wherein the roles are extracted from the role certificates associated with the transaction, each extracted role being hashed and these hashed roles being concatenated and hashed again, and then concatenated with hashes of other permission sets, if any, according to the authorization structure and hashed once again, resulting in a computed hash value which may be compared to that which was signed by the Transaction Administrator, a match indicating that the transaction is authorized.

16. A distributed workflow management system, the management system operating over a computer network comprising a plurality of interconnected computers and a plurality of resources, each computer including a processor, memory and input/output devices, each resource operatively coupled to at least one of the computers and executing at least one of the activities in a process flow, the system comprising:
  means for obtaining an electronic authorization of a transaction comprising an electronic representation of the transaction and a plurality of verifiable anonymous role certificates to be completed comprising at least one verifiable anonymous role certificate to be completed for each of a plurality of roles for which approval is required to be completed to obtain authorization of the transaction;
  means for extracting completed verifiable role certificates from said electronic authorization; and
  means for verifying whether completed role certificates, associated with the authorization, are themselves authentic.

17. The system of claim 16 wherein roles associated with the role certificates are hashed and compared with hashed roles in a database of hashed roles.

18. The system of claim 16 wherein the authorization is further insured by verifying that role certificates associated with the authorization correspond with roles in a permission set of roles of an authorization structure, the role certificates of which being required to authorize the transaction.

19. The system of claim 18 wherein the authorization structure is an authorization tree.

20. The system of claim 18, wherein the roles are extracted from the role certificates associated with the transaction, each extracted role being hashed and these hashed roles being concatenated and hashed again, and then concatenated with hashes of other permission sets, if any, according to the authorization structure and hashed once again, resulting in a computed hash value which may be compared to that which was signed by the Transaction Administrator, a match indicating that the transaction is authorized.

21. A message exchange mechanism operating over a computer network comprising a plurality of interconnected computers and a plurality of resources, each computer including a processor, memory and input/output devices, each resource operatively coupled to at least one of the computers and being able to read and write messages to be sent to another resource over the computer network, the mechanism performing the steps of:
  assembling an electronic authorization of a transaction comprising an electronic representation of the transaction and a plurality of verifiable anonymous role certificates to be completed comprising at least one anonymous verifiable role certificate to be completed for each role for which approval is required to be completed to obtain authorization of the transaction;
  extracting completed verifiable role certificates from said electronic authorization; and
  verifying whether completed role certificates, associated with the authorization, are themselves authentic.

22. The mechanism of claim 21 wherein roles associated with the role certificates are hashed and compared with hashed roles in a database of hashed roles.

23. The mechanism of claim 21 wherein the authorization is further insured by verifying that role certificates associated with the authorization correspond with roles in a permission set of roles of an authorization structure, the role certificates of which being required to authorize the transaction.

24. The mechanism of claim 23 wherein the authorization structure is an authorization tree.

25. The mechanism of claim 23 wherein the roles are extracted from the role certificates associated with the transaction, each extracted role being hashed and these hashed roles being concatenated and hashed again, and then concatenated with hashes of other permission sets, if any, according to the authorization structure and hashed once again, resulting in a computed hash value which may be compared to that which was signed by the Transaction Administrator, a match indicating that the transaction is authorized.

26. A message exchange mechanism operating over a computer network comprising a plurality of interconnected computers and a plurality of resources, each computer including a processor, memory and input/output devices, each resource operatively coupled to at least one of the computers and executing at least one of the activities in a process flow, the system comprising:
  means for extracting role certificates of at least one type from a message, said role certificates comprising at least one verifiable anonymous role certificate to be completed for each role for which approval is required to be completed to obtain authorization of the transaction; and
  means for verifying if said completed role certificates, associated with the authorization, are themselves authentic.

27. The mechanism of claim 26 wherein roles associated with the role certificates are hashed and compared with hashed roles in a database of hashed roles.

28. The mechanism of claim 26 wherein the authorization is further insured by verifying that role certificates associated with the authorization correspond with roles in a permission set of roles of an authorization structure, the role certificates of which being required to authorize the transaction.

29. The mechanism of claim 28 wherein the authorization structure is an authorization tree.

30. The mechanism of claim 28, wherein the roles are extracted from the role certificates associated with the transaction, each extracted role being hashed and these hashed roles being concatenated and hashed again, and then concatenated with hashes of other permission sets, if any, according to the authorization structure and hashed once again, resulting in a computed hash value which may be compared to that which was signed by the Transaction Administrator, a match indicating that the transaction is authorized.

* * * * *